(12) United States Patent
Kannan et al.

(10) Patent No.: US 10,726,427 B2
(45) Date of Patent: *Jul. 28, 2020

(54) METHOD AND APPARATUS FOR BUILDING A USER PROFILE, FOR PERSONALIZATION USING INTERACTION DATA, AND FOR GENERATING, IDENTIFYING, AND CAPTURING USER DATA ACROSS INTERACTIONS USING UNIQUE USER IDENTIFICATION

(71) Applicant: [24]7.ai, Inc., San Jose, CA (US)

(72) Inventors: Pallipuram V. Kannan, Los Gatos, CA (US); Ravi Vijayaraghavan, Bangalore (IN); Kranthi Mitra Adusumilli, Hyderabad (IN)

(73) Assignee: [24]7.ai, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/118,270

(22) Filed: Aug. 30, 2018

(65) Prior Publication Data
US 2018/0374107 A1 Dec. 27, 2018

Related U.S. Application Data

(63) Continuation of application No. 14/161,071, filed on Jan. 22, 2014, now Pat. No. 10,089,639.
(Continued)

(51) Int. Cl.
G06Q 30/02 (2012.01)
G06F 16/958 (2019.01)
H04L 29/08 (2006.01)

(52) U.S. Cl.
CPC ....... *G06Q 30/0201* (2013.01); *G06F 16/958* (2019.01); *G06Q 30/02* (2013.01); *H04L 67/22* (2013.01); *H04L 67/306* (2013.01)

(58) Field of Classification Search
CPC .......... G06Q 30/0201; G06Q 10/0631; G06Q 30/02; G06F 17/3089; H04L 67/22; H04L 167/306
See application file for complete search history.

(56) References Cited

U.S. PATENT DOCUMENTS 6,167,395 A 12/2000 Beck et al.
6,826,592 B1 11/2004 Philyaw
(Continued)

FOREIGN PATENT DOCUMENTS

WO 2002/101501 12/2002

*Primary Examiner* — Matthew S Gart
*Assistant Examiner* — Stephen S Swartz
(74) *Attorney, Agent, or Firm* — Perkins Coie LLP; Michael Glenn

(57) ABSTRACT

A computer-implemented method and a system facilitate social recognition of agents. A first user interface (UI) is presented to a customer on a device in proximity to the customer subsequent to a completion of an interaction of the customer with an agent. The first UI comprises one or more survey questions related to a performance of the agent. A determination of whether the performance of the agent satisfies a predetermined condition is performed based on an input received from the customer in response to the one or more survey questions. A second UI is presented to the customer to request the customer to provide an endorsement for the agent if the performance of the agent satisfies the predetermined condition. A posting of the endorsement on one or more social media profiles of the agent is effected upon receiving the endorsement for the agent from the customer.

20 Claims, 18 Drawing Sheets

Related U.S. Application Data

(60) Provisional application No. 61/769,067, filed on Feb. 25, 2013, provisional application No. 61/755,868, filed on Jan. 23, 2013.

(56) References Cited

U.S. PATENT DOCUMENTS

| | | |
|---|---|---|
| 7,191,129 B2 | 3/2007 | Brown et al. |
| 7,464,050 B1 | 12/2008 | Deaton et al. |
| 7,464,092 B2 | 12/2008 | Lee |
| 7,769,701 B2 | 8/2010 | Carus et al. |
| 7,886,343 B2 | 2/2011 | Sullivan et al. |
| 8,121,890 B2 | 2/2012 | Pinhanez |
| 8,170,549 B1 | 5/2012 | McCorkendale |
| 8,171,044 B2 | 5/2012 | Daigle |
| 8,229,401 B2 | 7/2012 | Elsey et al. |
| 8,326,777 B2 | 12/2012 | Zhang et al. |
| 8,370,155 B2 | 2/2013 | Byrd et al. |
| 8,411,830 B2 | 4/2013 | Gilbert et al. |
| 8,689,311 B2 | 4/2014 | Blinn |
| 8,798,242 B1 | 8/2014 | Sankaranarayanan |
| 8,892,446 B2 | 11/2014 | Cheyer et al. |
| 9,009,174 B1 | 4/2015 | Metz |
| 9,318,108 B2 | 4/2016 | Gruber et al. |
| 2003/0033370 A1 | 2/2003 | Trotta |
| 2003/0038840 A1 | 2/2003 | Stern |
| 2004/0064351 A1 | 4/2004 | Mikurak |
| 2005/0192792 A1 | 9/2005 | Carus et al. |
| 2005/0210016 A1 | 9/2005 | Brunecky et al. |
| 2005/0210047 A1 | 9/2005 | Hayes et al. |
| 2005/0228774 A1 | 10/2005 | Ronnewinkel |
| 2006/0149555 A1 | 7/2006 | Fabbrizio et al. |
| 2006/0167899 A1 | 7/2006 | Nagahashi et al. |
| 2006/0184410 A1 | 8/2006 | Ramamurthy |
| 2006/0265362 A1 | 11/2006 | Bradford et al. |
| 2007/0260596 A1 | 11/2007 | Koran et al. |
| 2007/0288454 A1 | 12/2007 | Bolivar |
| 2007/0288559 A1 | 12/2007 | Parsadayan et al. |
| 2008/0019500 A1 | 1/2008 | Torres |
| 2008/0215429 A1 | 9/2008 | Ramer et al. |
| 2009/0016522 A1 | 1/2009 | Torres |
| 2009/0164475 A1 | 6/2009 | Pottenger |
| 2009/0326947 A1 | 12/2009 | Arnold et al. |
| 2010/0057560 A1 | 3/2010 | Skudlark |
| 2010/0082527 A1 | 4/2010 | Jain |
| 2011/0047072 A1 | 2/2011 | Ciurea |
| 2011/0173077 A1 | 7/2011 | Patel et al. |
| 2011/0179469 A1 | 7/2011 | Blinn et al. |
| 2011/0238410 A1 | 9/2011 | Larcheveque et al. |
| 2011/0282758 A1 | 11/2011 | Jacobi et al. |
| 2012/0069131 A1 | 3/2012 | Abelow |
| 2012/0095863 A1 | 4/2012 | Schiff et al. |
| 2012/0166250 A1 | 6/2012 | Ferrante et al. |
| 2012/0166345 A1 | 6/2012 | Klemm et al. |
| 2012/0233258 A1 | 9/2012 | Vijayaraghavan et al. |
| 2012/0311684 A1 | 12/2012 | Paulsen et al. |
| 2013/0166332 A1 | 6/2013 | Hammad |
| 2013/0173583 A1 | 7/2013 | Hueter et al. |
| 2013/0218687 A1 | 8/2013 | Sohangir et al. |
| 2013/0254035 A1 | 9/2013 | Ramer et al. |
| 2013/0297721 A1 | 11/2013 | Chen |
| 2013/0299569 A1 | 11/2013 | Gentile |
| 2013/0304900 A1 | 11/2013 | Trabelsi |
| 2013/0339091 A1 | 12/2013 | Humay |

| Attribute | Value/Score | Last Update | Interactions | Confidence |
|---|---|---|---|---|
| Chat Propensity | 0.5 | 07/01/2012 | AD, SE, CA | High |
| Call Propensity | 0.1 | - | - | Default |
| Travel Score | 0.8 | 01/05/2011 | LE, SI, SX, EX, AV, WE | High |
| Wealth Score | 0.8 | 07/01/2012 | Third Party Data, CA | Medium |
| Tech Savvy | 0.9 | 12/12/2007 | LE Journey, BE Journey | High |
| Price Preference | 0.4 | 10/04/2010 | Se Online, OS | Medium |
| Seasonality Score (For each season) | 0.6 | 12/06/2011 | US, AV, EX | Low |
| Office Seeker Score | 0.05 | - | - | Default |
| Brand Loyalty Score (Per Client) | 0.4 | 2/18/2012 | VE, BB, OV | Medium |
| Time to purchase | 12 days | 6/03/2012 | OV | Low |
| Decisioning Behavior | Variety Seeking | 5/16/2012 | OP, BB | Medium |

FIG. 6

METHOD AND APPARATUS FOR BUILDING A USER PROFILE, FOR PERSONALIZATION USING INTERACTION DATA, AND FOR GENERATING, IDENTIFYING, AND CAPTURING USER DATA ACROSS INTERACTIONS USING UNIQUE USER IDENTIFICATION

CROSS REFERENCE TO RELATED APPLICATIONS

This application is a continuation of U.S. patent application Ser. No. 14/161,071, now U.S. Pat. No. 10,089,639 filed Jan. 22, 2014, which claims priority to U.S. provisional patent application Ser. No. 61/755,868, filed Jan. 23, 2013, and to U.S. provisional patent application Ser. No. 61/769,067, filed Feb. 25, 2013, each of which is incorporated herein in its entirety by this reference thereto.

BACKGROUND OF THE INVENTION

Technical Field

The invention relates to personalized interaction between a user and a provider based on user data, including interaction data, and using the same for personalization. Further, the invention relates to user interactions. In particular, the invention relates to enhancing the experience of the user during user interactions.

Description of the Background Art

User profiles can be broadly defined as a collection of various attributes of a particular person or customer. The scope of a profile depends on the nature of the company using the profile and the purpose of the user profile. A simple example is a user profile in the case of a portal which contains a login ID, a password, and preferences for the various settings that are provided to a user.

Personalization refers to the specific context within which a specific task is performed and can differ drastically from one person to another. Personalization essentially identifies the context or intent of the user and customizes the product or service that is being provided with respect to such context or intent. Personally identifiable information based modification, such as including the user's name in an online recommendation, or greeting the user with a name when the user calls an interactive voice response (IVR) system are examples of personalization.

Current techniques for creating user profiles are based on tracking user activities in different mediums on the Internet. Building a user profile for each user is essential for personalized services, such as product recommendation, proactive notifications, and personalized offers. A user profile is usually developed based on transactional data and behavioral data exhibited by the user on the Web. In certain cases, data provided by third party vendors, e.g. survey based, census based, and so on, and unstructured data, such as e-mails or posts on forums, is also used to develop user profiles.

Apart from social media, Web browsing, and offline transactions, customers also interact with the firms via instant service, chats, and telephone calls. However, gathering and using all such data for actionable outcomes poses several challenges which include, inter alia, scaling.

It would be advantageous to cover all aspects of user-related data to create a user profile and thus provide an efficient personalization technique.

Currently, a user has to interact with multiple companies and/or organizations over the course of time. Such interaction may be related to customer service issues, product information, and so on, and generally involves the user having to communicate over multiple channels and/or remember user IDs associated with each company and/or organization. It is not currently possible to link user interactions effectively across multiple channels and/or multiple organizations, and then store information from these interactions in a single repository.

Thus, it would be advantageous to correlate and store all user interactions that occur across multiple channels and/or multiple organizations.

It would be further advantageous if this interaction data could be used to gain an understanding of the user, i.e. a user profile, for example to provide valuable business and analytical insights about the user including the user's intent, behavior, sentiment, and preferences and to serve the user better in a more personalized manner.

SUMMARY OF THE INVENTION

Embodiments of the invention create a user profile and provide personalization by compiling interaction data. The interaction data is compiled to generate a value index or score from a user model. The process of converting interaction data into a score and/or value index parameterizes the data. Such data is stored as parameterized data. This compiled data, referred to herein as parameterized data is, used to build tools which help decide an engagement strategy and modes of engagement with a customer. Several facets relating to the user, such as user behavior, user interests, products bought, intent, chat language, and so on, are compiled to create a user profile based personalization technique.

Embodiments of the invention also provide a unique ID that can be mapped across multiple channels for use by the user to contact various organizations across multiple channels, and thus upgrade the user experience.

BRIEF DESCRIPTION OF THE DRAWINGS

FIG. 6 is a table that shows parameterizing data to behavioral scores for scalable and real time apps according to the invention;

DETAILED DESCRIPTION OF THE INVENTION

Figure 1:
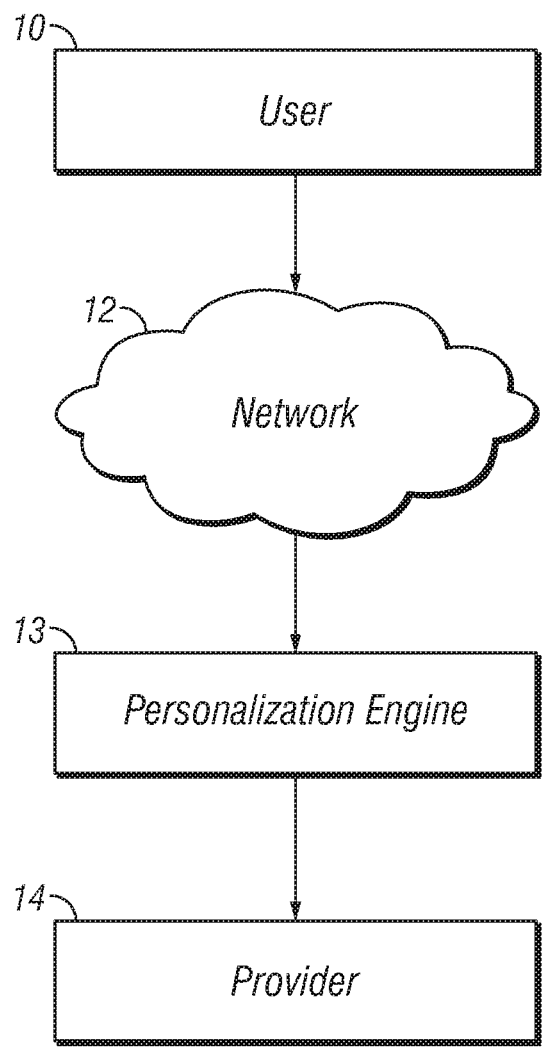
FIG. 1 is a block schematic diagram showing an overall system environment according to the invention.

Building a User Profile for Personalization Using Interaction Data

Embodiments of the invention concern building a user profile and personalization techniques. Compiling and analyzing user-related data, obtained from a variety of sources, determines the user profile and various forms of personalization. The profile is used for generating personalization services, such as product recommendations, notifications, and offers.

The personalization is based on data obtained directly from the user, purchase history, service intent, demographic data, and so on. In particular, personalization is driven by user intent, context, and information extracted from interaction data. Such interactions can occur, for example, via social media, Web browsing, and offline transactions. Users also interact with firms via instant service, chats, and telephone calls. Such interaction data is used to enrich the user's profile. Such rich data, in turn, provides better personalization. The personalization services deliver highly relevant query results, product recommendations, service offers, and so on. Results of transactions are aggregated to enhance the provision of personalization services in future transactions.

For purposes of the discussion herein, interaction refers to engagement of a user with either an agent or a system, which occurs, for example, when the user visits a website or calls or browses across channels to solve a particular issue, buy a product, etc. The interaction can span across multiple devices and multiple channels in real time, over an extended period of time, or at various intervals. For purposes of the discussion herein a channel refers to a mechanism with which user activity occurs, such as mobile apps, mobile browsing, Web browsing, speech, IVR, IM, etc.

Embodiments of the invention also address the problem of scaling. For purposes of the discussion herein, scaling refers to how all such interactions and other information can be used with reasonable resources and minimal delay in real time. Embodiments of the invention use this data specifically in the context of real time such as, for example, when the user visits the Web and then returns after two months. Using such information for personalization is not straight forward. Accordingly, the invention also provides for robust and scalable use of such interaction data.

One fundamental business objective is to convert a user searching for information pertaining to goods and services into a purchaser of the goods and services provided by a vendor. For example, it is important to deliver the right experience to the user based on all past contexts. Embodiments of the invention personalize the user's online experience by building a user profile, and apply the user profile to one or more personalization applications by analyzing multiple data sets related to the user. The user data is collected from a variety of sources and includes unique personal identifiers, such as name, email address, and so on. In addition, aggregate data is obtained and examined including product purchase history, service requests, brand loyalty, ethnicity, and so on. The result of the data analysis is a so-called personalization engine, which is based on the user profile and which makes recommendations to the user, for example with regard to goods and services. The relevance of the recommendations is enhanced based on the personalization engine and the user profile.

FIG. 1 is a block diagram showing an overall system environment for building a user profile and applying a personalization technique by compiling and analyzing all aspects of user related data, specifically interaction data, according to the invention. As shown in FIG. 1, an embodiment of the invention comprises a network 12 and a provider 14. Different sets of data, such as unique data, aggregate data, transaction data, and interaction data comprise the data to be evaluated to generate a user profile for the user 11 with the personalization engine 13. Interaction between the personalization engine and the provider includes delivering the personalization as well as tracking the user. Functions performed include user identification; data collection; data association with the right user; extraction of relevant information from the data, i.e. attributes; conversion of attributes into user profile attributes; using the profile attributes along with present interaction data to identify various intents; based on the intents, personalizing the appropriate service; and providing the right help through the most appropriate mechanism and/or channel.

In embodiments of the invention, the user may be any of an individual, group, organization, client, server, and the like. In another embodiment of the invention, the user may communicate and/or interact through a user device. The user device may be any of a mobile phone, desktop computer, laptop, tablet, or any other device which enables the interaction.

The network may use any suitable communication technology to communicate with the user 11.

The provider 14 may be any provider of information, services, and/or goods, as well as intermediaries or other parties who do not directly provide such information, services, and/or goods to the user, but otherwise interact with those parties who do provide such information, services, and/or goods.

The personalization engine identifies a plurality of users and targets relevant content to be delivered to these users. The personalization engine provides customization of content delivery by extracting and analyzing key concepts and items of information that users make known to the provider. Further, the personalization engine tracks trends in user behavior, user interests, and technology configurations which may be tracked to identify user involvement levels and trends. Because the user profile is updated with each user interaction, the personalization engine keeps track of the evolving nature of customer intents and interests for each user over time and uses this information for personalization.

Figure 2:
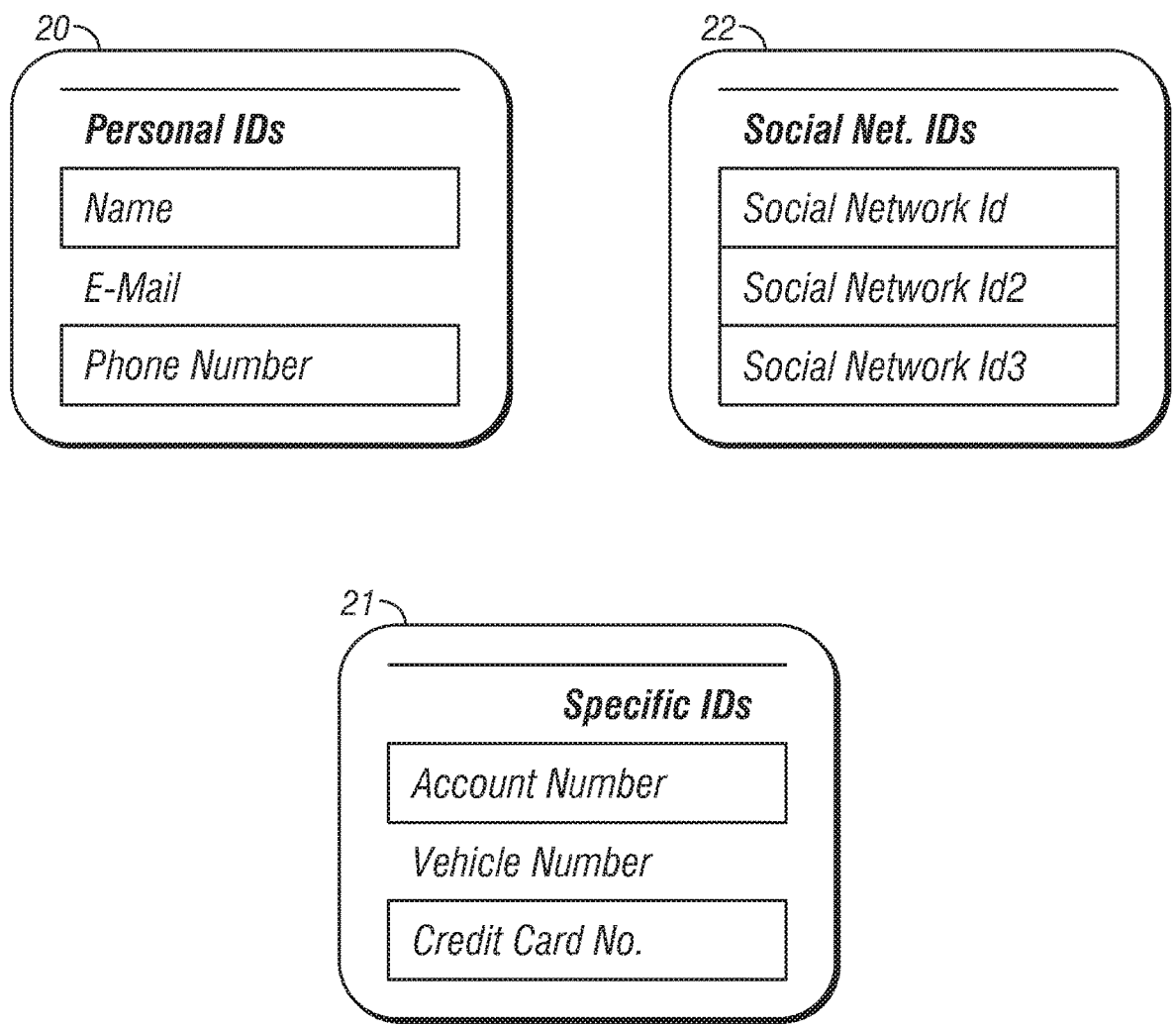
FIG. 2 illustrates information sources used in identifying a user by the user's unique attributes according to the invention.

FIG. 2 illustrates information sources used in identifying a user by the user's unique attributes according to the invention. As shown in FIG. 2, such information sources can include, but are not limited to, persons IDs 20, social net IDs 22 and user specific IDs 21.

Figure 3:
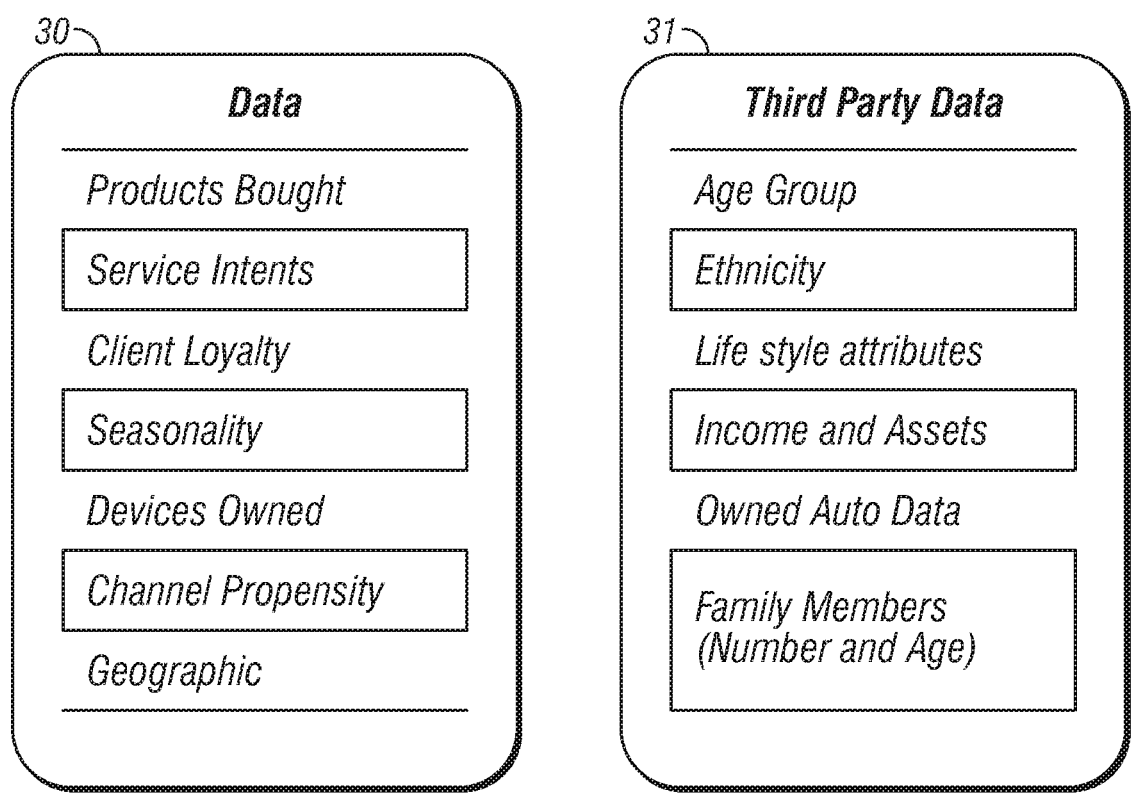
FIG. 3 illustrates information sources used in gaining knowledge about the user via user-level aggregate data according to the invention.

FIG. 3 illustrates information sources used in gaining knowledge about the user via user-level aggregate data according to the invention. As shown in FIG. 33, such information sources can include, but are not limited to, system data 30, such as products bought, service intents, user loyalty, seasonality, device owned, channel propensity, and geographic information; and third party data 31, such as ethnicity, life style attributes, income and assets, owned auto data, and family member, e.g. number and age.

Figure 4:
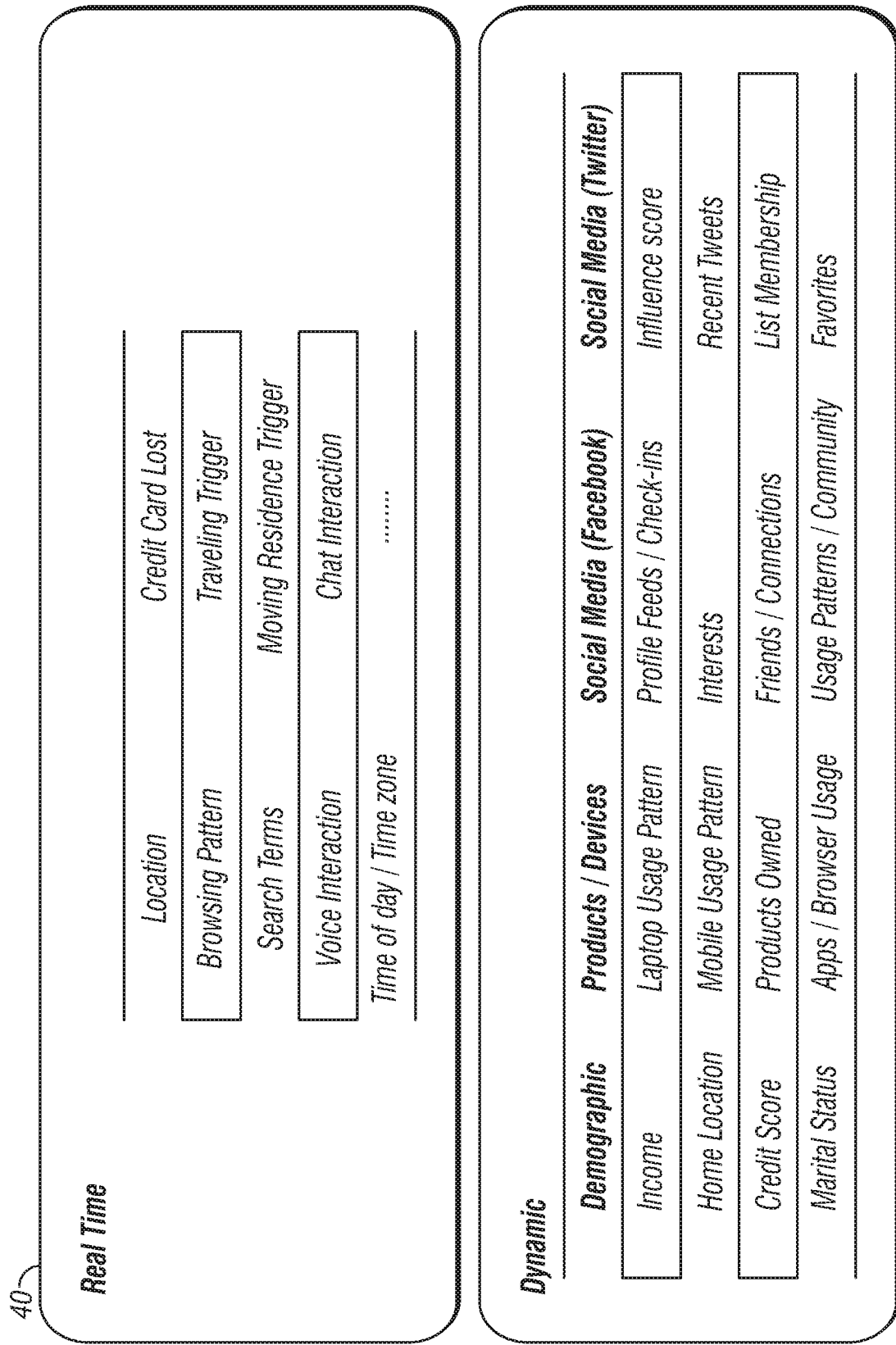
FIG. 4 illustrates information sources used in providing personalization using recent transaction and behavioral data according to the invention.

FIG. 4 illustrates information sources used in providing personalization using recent transaction and behavioral data according to the invention. As shown in FIG. 4, such information sources can include, but are not limited to, real time information 40, such as location or service specific information, e.g. with regard to a lost credit card; and dynamic information 41, such as demographics, products and/or devices, social media, e.g. Facebook and/or Twitter.

The various data elements include unique data, aggregate data, transaction data, and interaction data. Unique data corresponds to unique identification parameters of the user, such as name, e-mail ID, social networking websites ID, vehicle number, credit card number, and so on. Aggregate data relates to the user in connection with products bought, service intents, client loyalty, devices owned, channel propensity, geography, age group, ethnicity, lifestyle attributes, and so on of the user. Transaction data relates to the user's location, browsing pattern, travelling trigger, income details, marital status, laptop usage pattern, social media interests, and so on. Interaction data relates to all chatting pattern (data) and all calls of the user, as well as any other interaction that occurs between the user and the chat agent.

Each user has some identifiers that do not change much over time, such as the user's name. These are the unique attributes. Some aspects, such as age, income, etc. change with time. This is also true with behavioral aspects, such as products owned, purchases made, etc. At any given instance, the user profile is based on an aggregation across all such data for the user. The more dynamic and real time aspects are considered as transactional data.

Real-time data can consist of information which is evolving at that time period (day or hour), such as interaction in another channel. This data can be processed and included as part of the user profile aggregate data. However, for robust solution and by principle this data is preferably handled separately.

By building an accurate user profile based upon user behavior characteristics and aggregation of user data, a value index or score may be generated. All user related data is parameterized to generate behavioral scores, which is necessary for scalable and real time applications.

In embodiments of the invention, a score for user behavior characteristics may be generated by ranking procedure, statistical techniques, or any other relevant scoring method. The following two examples illustrate the principle of generating scores:

1. Purchase propensity which is a numeric value that indicates a user's tendency to buy and can be stored as a purchase score. When the user returns to a site, at any given instance, instead of examining the user's past historical data in its entirety, the parameterized information stored as the purchase score, along with evolving user behavior during the current interaction, is used to arrive at an updated purchase propensity for the user. Personalization is based this score. Alternatively, in the absence of any information, a default score can be considered.

2. Wealth Score: In the absence of any information a default score is considered. Based on the user's location, identified through the user's IP address or GPS location, a particular purchasing power, e.g. income level, etc., which is similar to the purchasing power in the particular area is assigned to the user. Further, based on the user's purchases and browsing activity, and the associated cost of the purchased and/or browsed products, this score can be adjusted. For example, if a user is buying a high end product which users in the band of present associated purchasing power do not buy, the score of the user is increased. The scale of increase depends on the logic and/or algorithm employed for the purpose. The wealth score is used for personalization, such as offering products to the customer based on the purchasing power.

Figure 5:
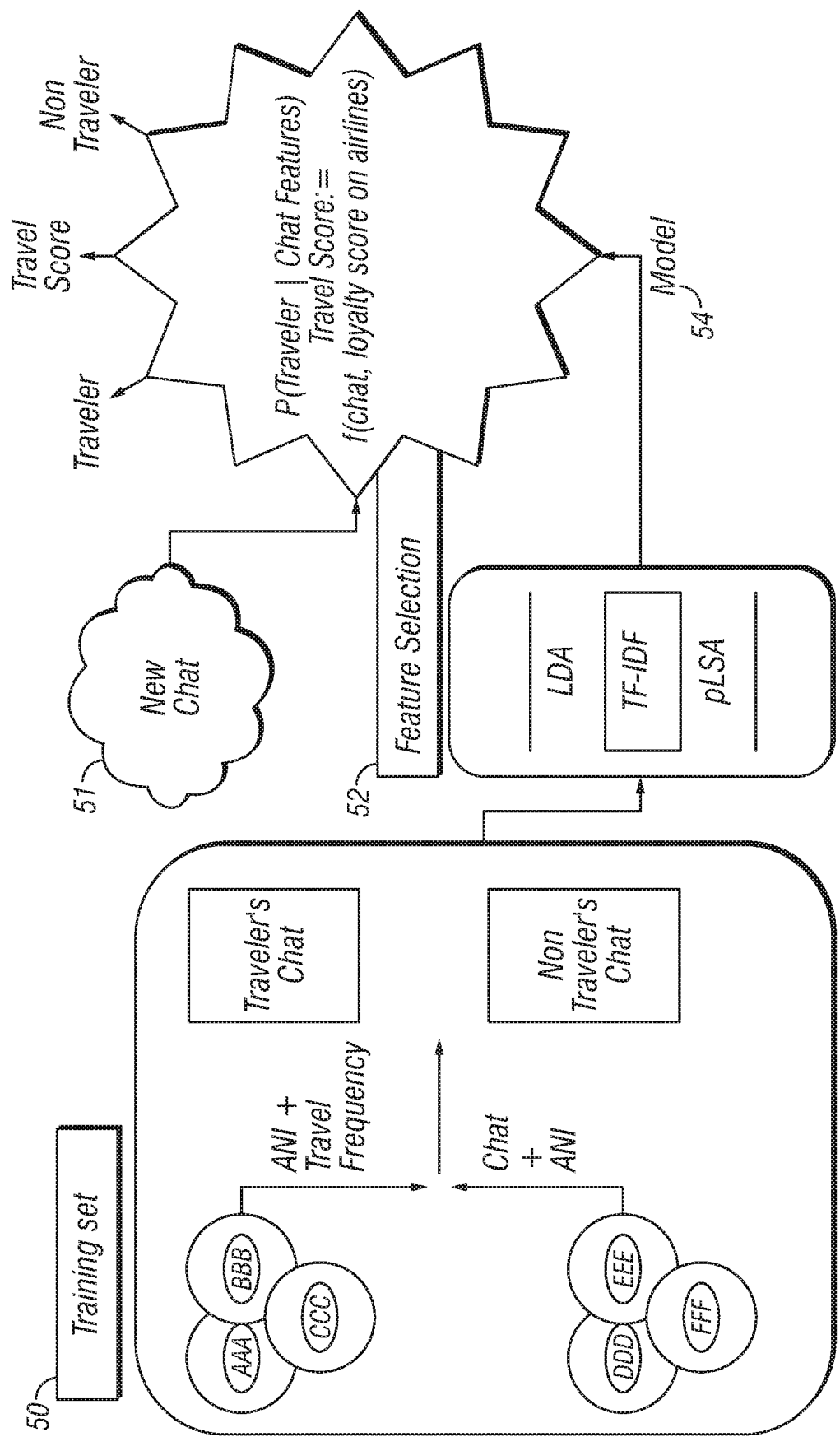
FIG. 5 is a block schematic diagram that shows the building of a model for generating a value index score according to the invention.

FIG. 5 is a block schematic diagram that illustrates a specific example of building of a model for generating a value index score according to the invention. In FIG. 5, component 50 is a training data set which comprises chat data from various organizations, and which is mapped using, for example, ANI, i.e. the user's telephone number, with call data made to various travel related organizations. If the ANI has a number of travel related calls associated with it within a band that is not too high, which indicates that the telephone belongs to a travel agent, and not too low, which indicates that the telephone belongs to a non-traveler, the associated chat is tagged as associated with traveler chat. Else, the call a not traveler's chat. These two classifications within the training data set are used for modeling in a next component.

Component 52 is the feature extraction function, where various sets of machine learning an/or statistical models are used to extract features which differentiate a traveler chat from a non-traveler.

The functions performed by component 54, i.e. model P(.) & f(.), are derived from component 52. The core functions necessary for components 51 and 52 are included as core elements within the model.

When a new chat 51 occurs, the chat is applied to the model to identify, for example, if the user in the new chat is a frequent traveler or a non-traveler, and to provide a travel score for the user. This information is then used to personalize the user's experience.

For example, user X, user Y, and user Z are frequent users of social networking, online shopping, and banking websites. On a comparative basis, user X, user Y, and user Z are prominent users of social networking, online shopping, and banking websites, respectively. Therefore, the data obtained from the websites is parameterized to obtain a behavioral score. The value index or behavioral score of a user is based on the amount of personal information that the user has disclosed either explicitly or implicitly.

FIG. 6 is a table that shows parameterizing data to behavioral scores for scalable and real time apps according to the invention. One purpose of creating a user profile is to provide personalized services, such as product recommendation, proactive notifications, and personalized offers. Personalization typically requires some aspects of user modeling to understand the user's tastes, context, or location change. For example, based on past interactions, channel propensity can be obtained from the user and the price preference for a particular brand may be obtained from a particular interaction. Further, a default setting may be provided in the absence of a particular attribute. The parameterized data may be used to build tools which decide how and when to engage with a particular customer. Therefore, complete personalization may be achieved using real time transaction and behavioral data, aggregate data, and unique identifiers associated with a profile. Other attributes, such as chat propensity, call propensity, travel score, wealth score, and so on are scored and given a value and/or score.

Embodiments of the invention obtain user information from one or more user journeys. Journeys can include journeys of a user's of life and the user's commercial life. A journey of life indicates major life changes of the user, such birth, going to college, marriage, shifting jobs, etc. Identifying these changes via observing appropriate triggers in accordance with embodiments of the invention opens new opportunities for promotions, up-sell, etc. A journey of commercial life occurs where the customer is in a purchase cycle, subscription cycle, loyalty cycle, etc. and may also concern, for example, the age of a device bought and when is a good time to replace the device, e.g. a cellphone upgrade cycle, etc.

Tying both of these journey produces valuable information.

Embodiments of the invention also concern leveraging financial, neighborhood, and family information. The user's buying behavior is clearly dictated by income and the kind of people with whom the user interacts, e.g. family or neighbor. Models used to predict such behavior must be dynamic and must account for changing aspects of the user, such the user's financial situation. Most of the time, buying decisions are influenced by family member requirements. The neighbor and family data, indicate if a change in the purchase pattern is a permanent change in behavior or a transitory behavior.

People also prefer to use different channels when performing different tasks. Understanding this dynamic requires building channel propensity models using cross-client data. For instance, a person might use an iPhone for casual and/or quick browsing, but this person prefers bigger screen devices, such as iPad or iMac, when making a purchase. The intent of the user can also be better gauged by integrating various data sources. Unique identifiers are created, captured, and/or passed between multiple contact channels, e.g. Web, mobile, interactive voice response (IVR), phone, automotive, television, to identify and tag the user and their context, e.g. history, past behavior, steps progressed, obstacles and/or issues encountered, etc., uniquely (see commonly assigned U.S. patent application Ser. No. 13/897,233, filed May 17, 2013, which application is incorporated herein in its entirety by this reference thereto).

Figure 7:
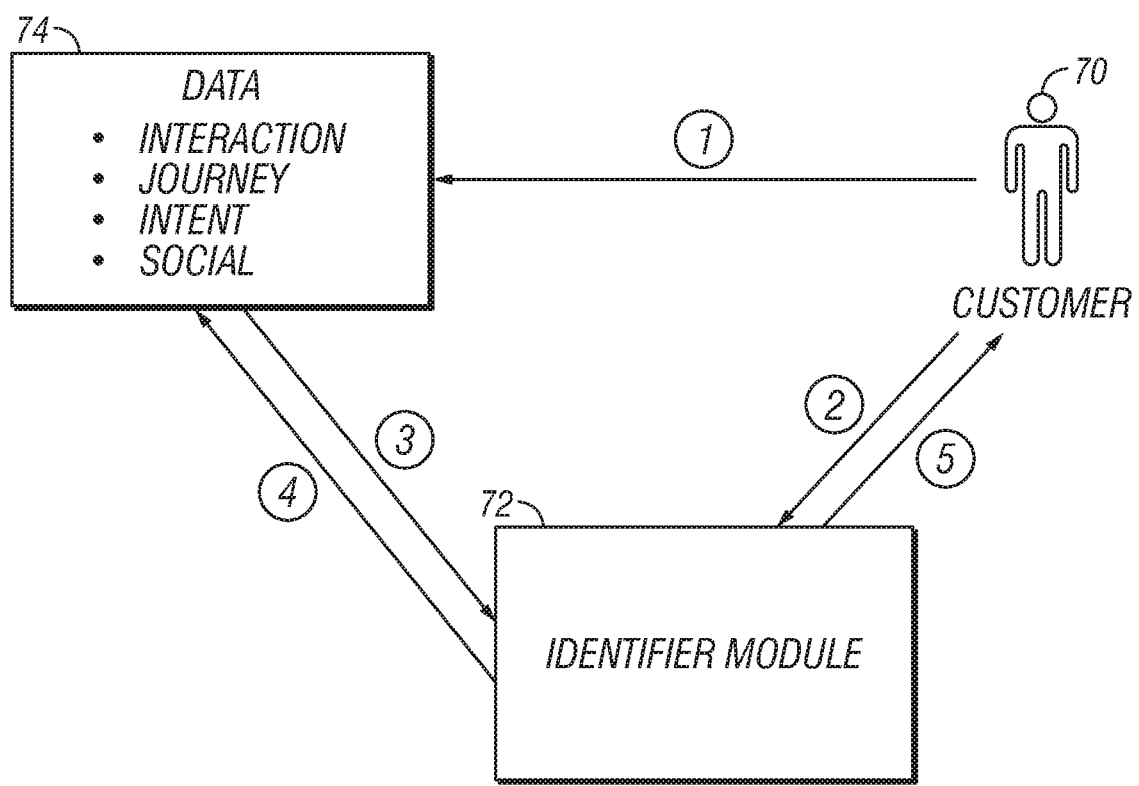
FIG. 7 is a block schematic diagram showing customer identification according to the invention.

FIG. 7 is a block schematic diagram showing customer identification according to the invention. In FIG. 7, a customer 70 is in communication with an identifier module 72 and a data management system 74 which includes such information, for example, as the customer's interactions, journey, intent, and social actions. In operation, the customer data is stored to the data management system (1), the customer provides any inputs that are required to select an identifier (2), the data management system uses data to associate different sessions and/or journeys to select appropriate options to present to the customer (3), an identifier confidence score is associated with various journeys stored in the data management system (4), and the system provides the customer with options to select an identifier (5).

Figure 8:
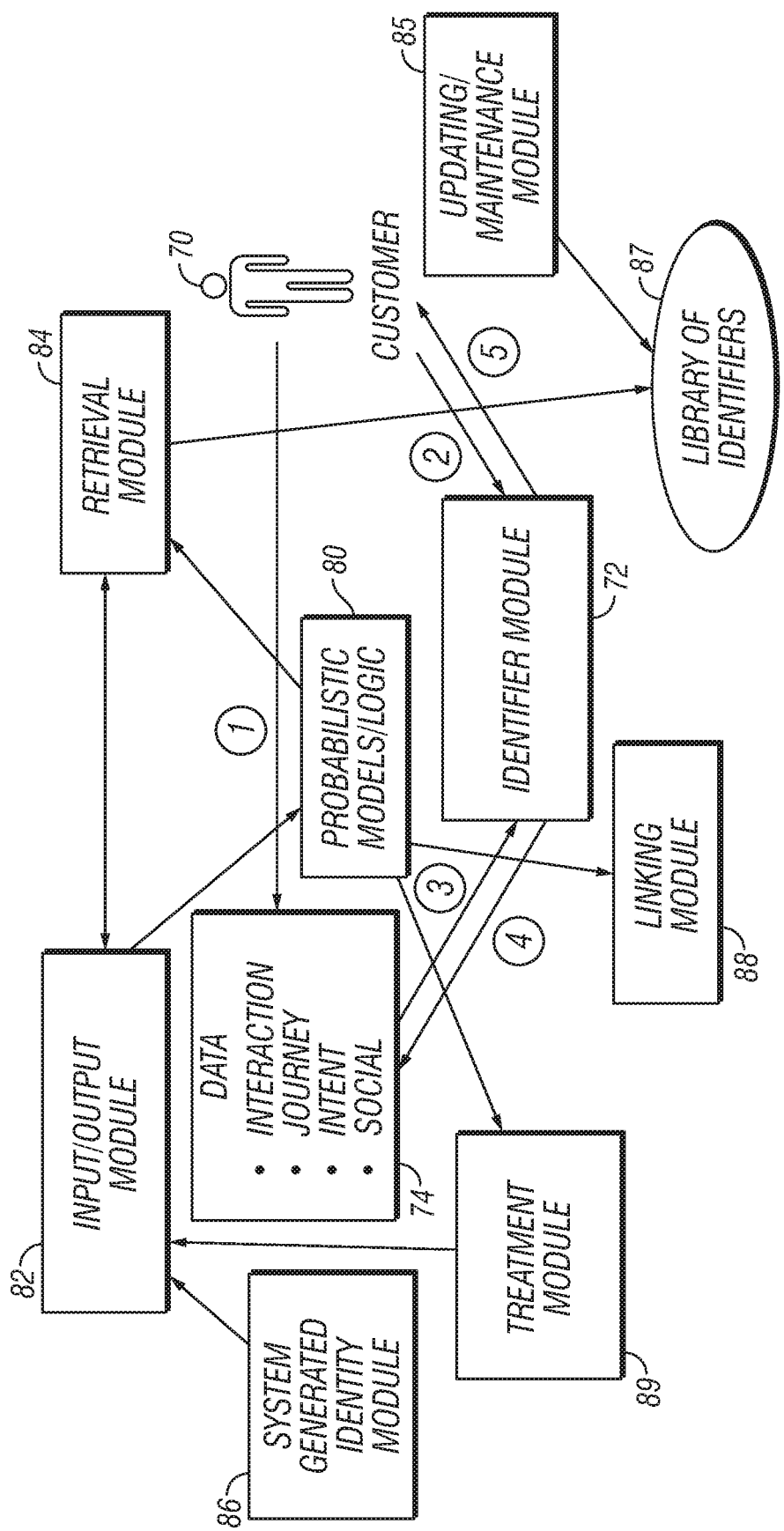
FIG. 8 is a block schematic diagram showing an identifier module according to the invention.

FIG. 8 is a block schematic diagram showing an identifier module according to the invention. In FIG. 8, the data system and customer access the module via an input/output module 82. A retrieval module 84 extracts a list of identities from the library of identifiers 87 to identify the customer. Interaction with the customer is effected by the probabilistic models and logic 80. The treatment module 89 provides the right option to the right customer to get the required data. The linking module 88 links a current interaction with past interaction based upon various identifiers and data. An updating and maintenance module 85 maintains and updates the library of identifiers. The system generated identity module 86 generates customer identities when the customer is not generated by the customer.

Figure 9:
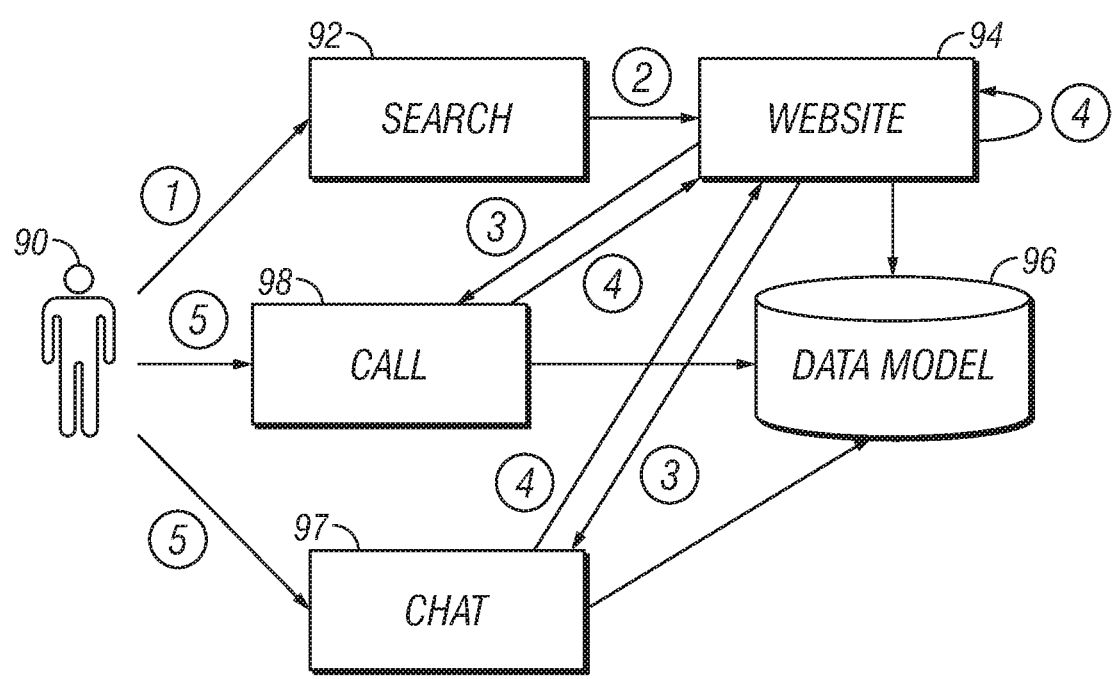
FIG. 9 is a block schematic diagram that shows multi-channel user interaction that originates with a user search according to the invention.

FIG. 9 is a block schematic diagram that shows multi-channel user interaction that originates with a user query according to the invention. In FIG. 9, a user 90 posits a query (1) with a search facility 92. The search is executed (2) and the user lands at a website 94, where the user may browse. The user is offered the ability to chat or call (3) via a chat facility 97 or a phone 98, for example depending upon the options available to the user, such as VOiP or Skype. After user interaction (4) directly with the website, via a call, or via a chat session, the user resumes his journey. Thereafter, the user returns (5) via a call or chat session. All of this user interaction information is captured and processed in a data model 96.

Embodiments of the invention use customer interaction data to predict consumer behavior and build an economic portrait of the user, based on such interactions.

Users routinely initiate interactions with one or more organizations, where the interactions include queries for customer service support, product information, and so on. These interaction progressions or journeys are initiated by the user across multiple channels, where the channels include one or more of Web-based techniques, including Web pages, chat, and social media; voice communication techniques, including landline, cellular, and VoIP; text-based techniques, including cellular chat and interacting with an app; and so on. The journeys can include interactions with one or more organizations. Each user interacting with the one or more organizations is assigned a unique identifier. The user information is collected from the one or more channels and the one or more organizations. The user information is stored and analyzed to determine how to serve the user better.

Users routinely interact with one or more organizations over a period of time for product information, customer service queries, and so on. The user interactions include the use of multiple channels, where the channels include voice, text, and so on, to communication with the one or more organizations. Embodiments of the invention capture user information across two or more channels or organizations. After determining a user's unique identity, e.g. user name, email address, and so on, or assigning a unique identifier to a user, user data is collected across the plurality of channels and the plurality of organizations. The user information from the one or more channels and the one or more organizations is tracked and stored in a database using the unique user identifier. The stored user data is analyzed to determine user information including user intent, behavior, sentiment, and preferences. Further, the analyzed user information is used to build, update, and modify a user profile which is related to the user's unique identifier.

In an embodiment communication or interaction may occur between the user and provider through a user and an agent, respectively. The agent may be human, automated, or any other mechanism which enables the interaction.

One goal of personalization is to create desirable perceptions and responses from the user and to encourage a user to continue contacting the provider, while avoiding undesirable perceptions that discourage users from so contacting the provider.

Figure 10:
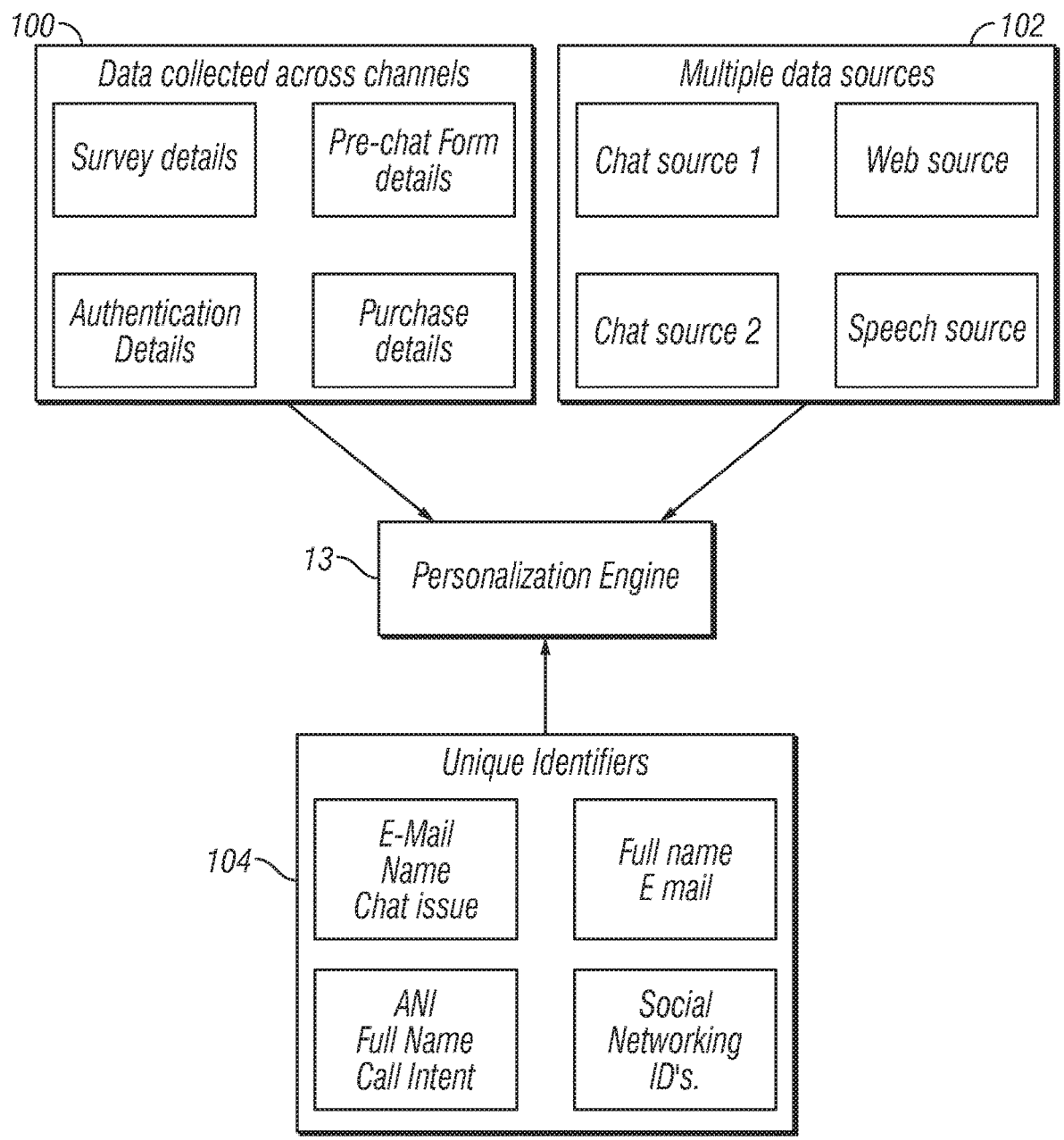
FIG. 10 is a block schematic diagram showing different sets of data collected according to the invention.

FIG. 10 is a block schematic diagram showing different sets of data collected according to the invention. To create a user profile, data is collected across a plurality of channels 100, multiple data sources 102, and unique identifiers 104. The creation of a user profile is a continuous process and cannot be deemed complete at any point of time. The user may be active in a variety of channels, such as social networking websites, survey websites, or browsing provider's websites. The pattern of user browsing behavior may also indicate that the user is not consistently active in all channels. In any event, data can be collected from all of the various channels on which the user is active over time to create and maintain a user profile.

The data collected across channels 100 also includes survey details, pre-chat form details, authentication details, and purchase details. The multiple data sources 102 may include data sourced from different chat clients, Web clients, and speech clients. The user data includes details, such as browsing history, flight information, shipping address, purchased items, and so on.

Making exact linkages allows for different levels of confidence based on statistical and/or probabilistic scoring of accuracy and/or certainty and unlocking different levels of access, permissions, and empowerments correlated to the level of confidence in the linkage and/or identification of the unique individual. Such approach first identifies characteristics, i.e. data, from within user behavior which can be clustered. The characteristics are used, either deterministically or probabilistically, to identify and label a unique user. A linkage of that unique user is then enabled across channels, devices, within and across sessions.

Once the system is able to track users across a session, a unique identifier can be associated with the user, for example ANIs or Web cookies can be identified as belonging to same user. In operation, the user data is stored to a data management system, the user provides any inputs that are required to select an identifier, the data management system uses data to associate different sessions and/or journeys to select appropriate options to present to the user, an identifier confidence score is associated with various journeys stored in the data management system, and the system provides the user with options to select an identifier.

For a further discussion of user context, e.g. journey, intent, actions, steps, experience to date, historical behavior, preferences, etc., as well as predictive techniques applied to such user context see, for example, commonly assigned U.S. patent application Ser. No. 13/239,195, filed Sep. 21, 2011; Ser. No. 13/349,807, filed Jan. 13, 2012; Ser. No. 13/454, 726, filed Apr. 24, 2012; Ser. No. 13/461,631, filed May 1, 2012; Ser. No. 13/443,782, filed Apr. 10, 2012; Ser. No. 13/599,974, filed Aug. 30, 2012; and Ser. No. 13/852,942, filed Mar. 28, 2013, each of which application is incorporated herein in its entirety by this reference thereto.

Figure 11A:
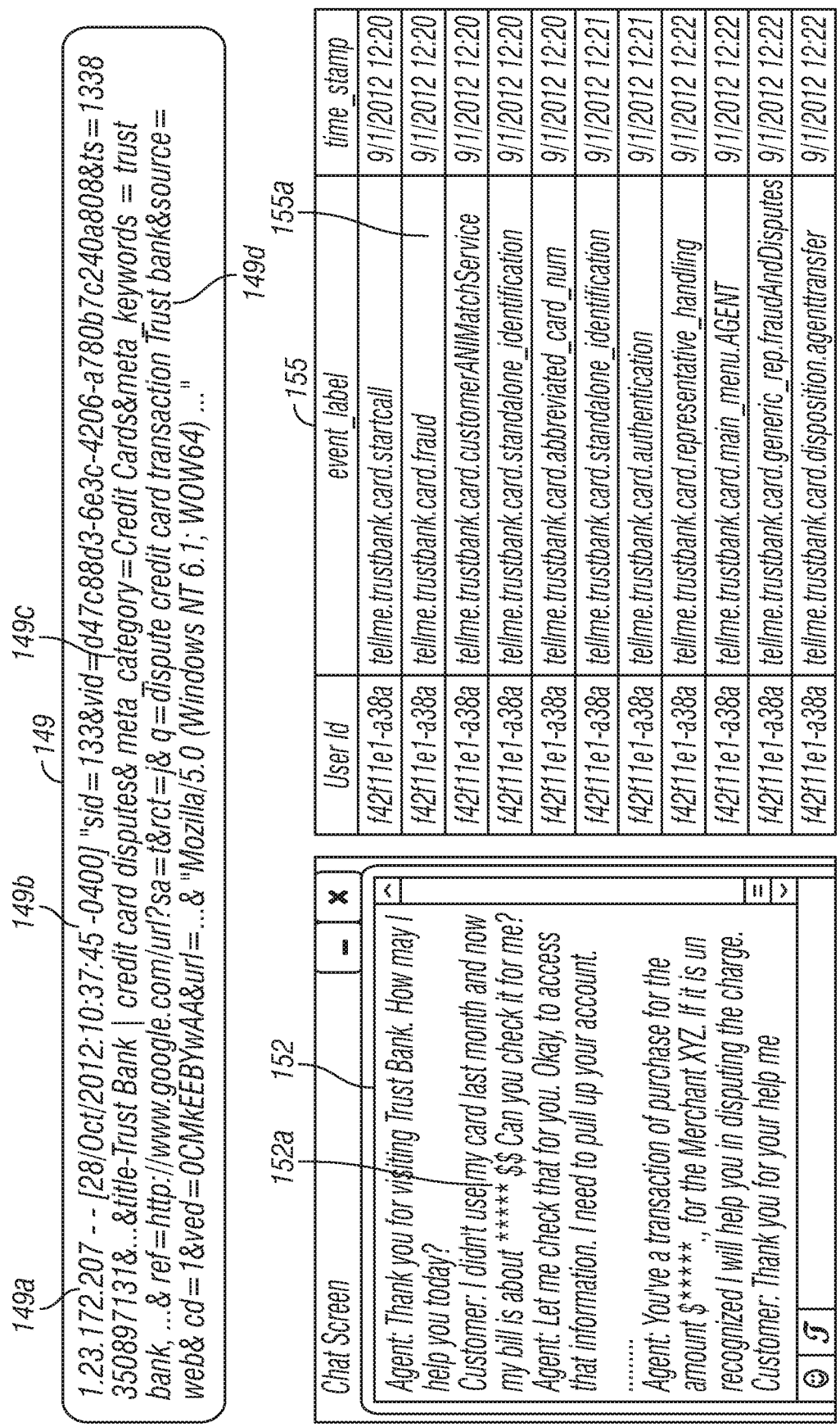
FIG. 11A-B is a screen shot showing data that can be collected across a plurality of channels according to the invention.
Figure 11B:
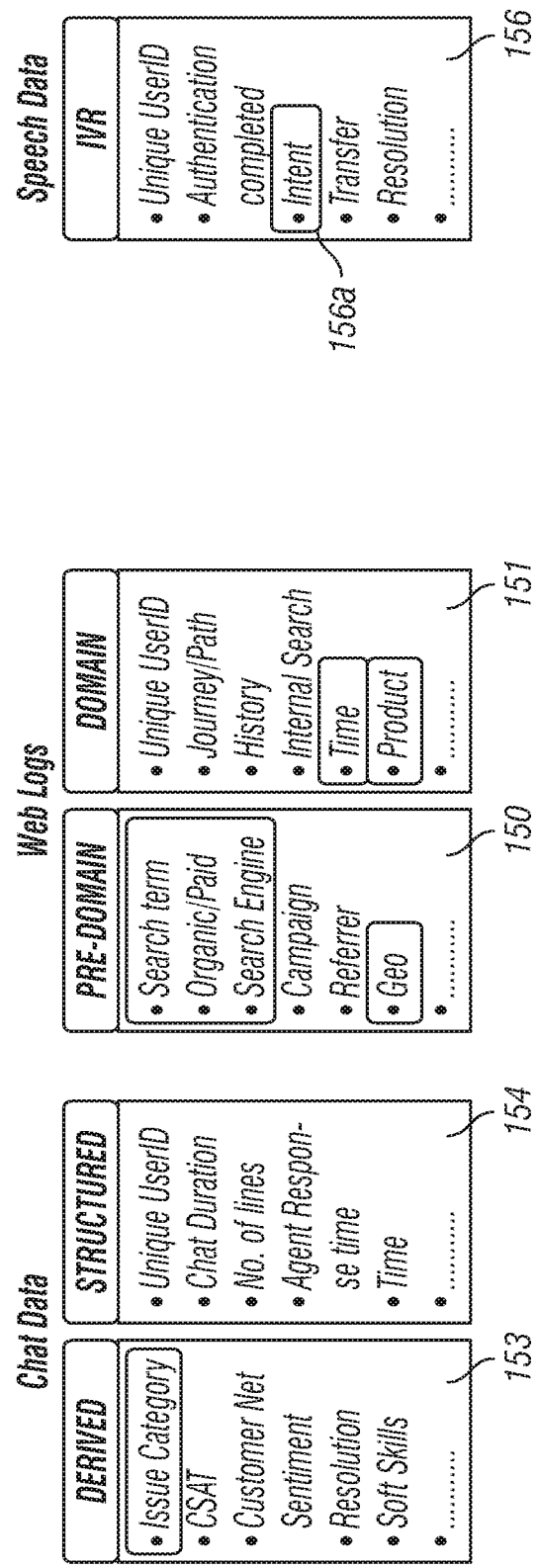

FIG. 11A-B is a screen shots showing data that can be collected across a plurality of channels according to the invention. Web logs 50, 51 are sample descriptions of various attributes of the user that can be extracted from the raw data 49. Web logs fall broadly into two categories: website dependent Web logs 51 and independent Web logs 50. Independent Web logs consists of elements, such as search term; nature of search term, e.g. paid or organic, search engine, etc.; geography attributes of the user derived from the user's IP address; and so on. Dependent Web logs, among other aspects, consists of a unique identifier which helps tie the data with other sources. Dependent Web logs not only include current user Web browsing data, but also include data from previous user journeys, and ad derived attributes such as whether a search was made, whether a specific product was viewed multiple times, etc.

The chat screen 52 depicts a transcript of sample chat between an agent and the user. The example is for a transaction dispute. This intent can be derived from the highlighted text 52a.

Chat data 53, 54 are derived and structured data attributes that can be obtained from the chat transcript. Structured chat data 54, apart from the unique identifier, consists of data elements relative to the chat session, such as chat duration, number of times, variations in agent response time, etc. Derived chat data 53 consists of text based attributes, such as issues addressed during the chat, whether resolution was reached during the chat, soft skill score for the chat based on the language used in the chat, etc. For some of the attributes in the chat screen heuristics and text mining models are employed.

Semi-processed IVR logs 55 show the intent 55a of the call, which can be deciphered from speech data captured during an IVR session.

IVR data 55 is sample of data attributes associated with IVR log data. The IVR data includes a unique identifier and the call flow, based attributes such as whether authentication was completed, whether the problem was resolved, the intent of the call 56a, etc., as well as other structured attributes such as the length of the call, etc. Some of these attributes may require the use of algorithms or heuristics to extract relevant data.

The personalization engine monitors data which has been collected across various channels. The personalization engine also provides authentication and service points where it supplies portions of the related profiling and targeting process to the user. The personalization engine may attempt to help each user find certain sets of products that may be more valuable to the user amongst thousands of products. The personalization engine also seeks to determine the user's product preferences by analyzing the user's purchase behavior and product usage feedback.

When a customer visit's a website, the system knows information related to the customer's previous visits, calls, and other interactions with the system, as well as information such as purchases, etc. This information can be stored in a backend database, as well as in Web storage, such as cookies, or as a combination of both. When a customer visits, the website for the first time, a unique ID is associated with the customer. This unique ID is stored in a cookie, as well as in a backend database. Any further activity is associated with this ID, e.g. in the database or in the cookies.

In some embodiments of the invention, unique customer identification and behavior between either concurrent or sequential channels of engagement and different devices is linked, as set forth in copending, commonly assigned U.S. patent application Ser. No. 13/897,233, filed May 17, 2013, which application is incorporated herein in its entirety by this reference thereto. Linkages are created across channels and devices within the same session, as well as across sessions. These links can be made probabilistically, based on machine learning and statistical models driven by behavior and other attributes of customer journeys. Unique identifiers are created, captured, and/or passed between these multiple contact channels, e.g. Web, mobile, interactive voice response (IVR), phone, automotive, television, to identify and tag the customer and their context, e.g. history, past behavior, steps progressed, obstacles and/or issues encountered, etc., uniquely.

When a customer visit's the website, the system knows information related to the customer's previous visits, calls, and other interactions with the system, as well as information, such as purchases, etc. This information can be stored in a back end database, as well as in Web storage, such as cookies or as a combination of both.

When a customer visits the website for the first time, a unique ID is associated with the customer. This unique ID is stored in a cookie, as well in a back end database. Any further activity is associated with this ID in the database or in the cookies. Uniquely, the nature of data includes substantially all possible interactions along with Web data, intent prediction and channel affinity predictions based on various machine learning and statistical models can be used. These help to identify the intent of the customer, as well as the right time to offer, e.g. chat.

See copending, commonly-assigned U.S. patent application Ser. No. 13/852,942, filed Mar. 28, 2013, the entirety of which is incorporated herein by this reference thereto, which provides a method and apparatus that enables identification of customer characteristics and behavior, and that predicts the customer's intent. Such prediction can be used to adopt various business strategies dynamically to increase the chances of conversion of customer interaction to a sale, and thereby increase revenue, and/or enhance the customer's experience.

To this end, intent prediction and channel affinity predictions based on various machine learning and statistical models, such as Logistic Regression, Naive Bayes, support vector machine (SVM), and other such classifiers and other non-parametric techniques, such as K Nearest Neighbor (KNN), can be used to help identify the intent of the customer, as well as the right time to offer services to the customer, e.g. a survey.

Figure 12:
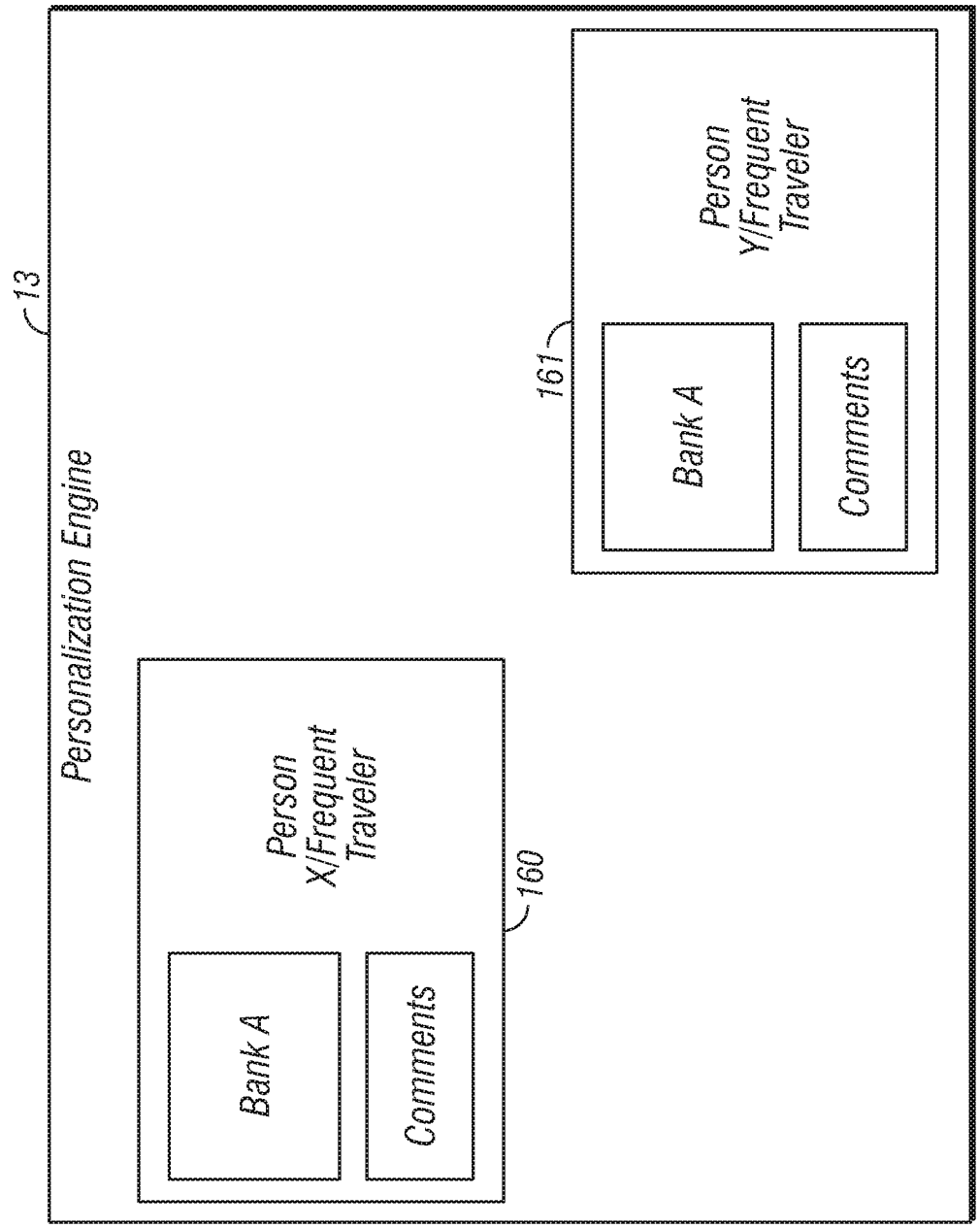
FIG. 12 is an illustration of a user profile mapped across channels for users having a high travel score look-alike according to the invention.

FIG. 12 is an illustration of a user profile mapped across channels for users having a high travel score look-alike according to the invention. For example, multiple interactions through a plurality of channels are considered, such as chat, Web, and automatic number identification (ANI). Consider that user x uses DY laptop. User x reveals during a chat session that he is a frequent flyer. Therefore, user x has a high travel score. Further, user x may reveal some other information related to banking, hospitality, and so on through other mediums.

As shown in FIG. 12, consider that Person X (160) and Person Y (161) are frequent travelers in a certain airline. Based on this information, details such as the address of the user, contact details, and type of customer may be obtained. Further, person X may have made some remarks or comments regarding a product that he purchased. For example, if person X had purchased a laptop, he may comment that he travels a lot, but also uses his laptop for power computing.

This statement further ascertains the fact that person X is a frequent traveler, while also providing information on his type of laptop usage. The terms or language used by frequent travelers may also be used to develop a user model.

Further, if it is known that person Y also uses a laptop frequently while travelling, person Y may also have made some comments regarding the laptop and/or laptop usage. This information helps recommending the best products and/or offers to person X and person Y.

Although, the embodiments of the invention that are discussed herein use data obtained based on travelling patterns in a certain airline, it will be evident to a person of ordinary skill in the art that the data that is used to build a user profile and efficient personalization technique may be considered across all sets collected from a plurality of sources, including Web browsing, offline transactions, social media, and so on.

Figure 13:
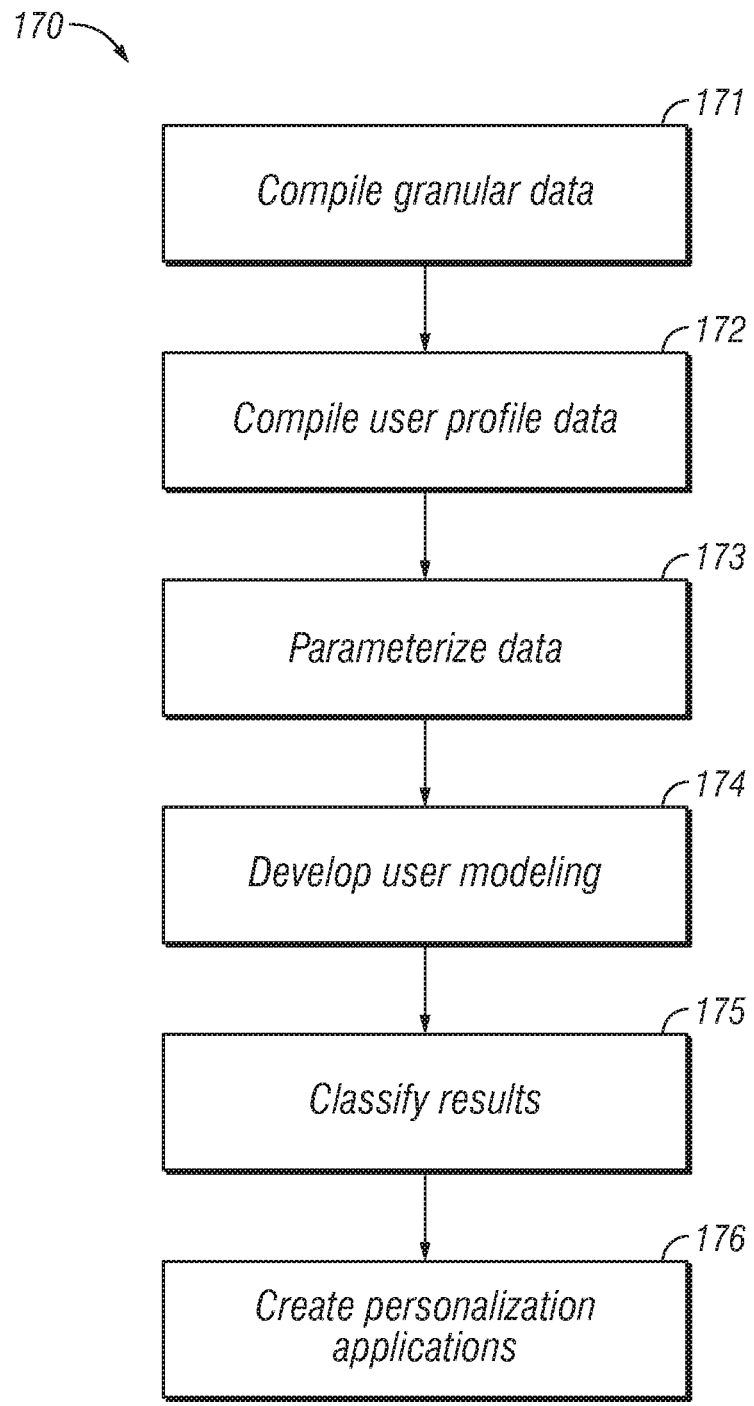
FIG. 13 is a flow diagram showing creation of a personalization application according to the invention.
Figure 17:
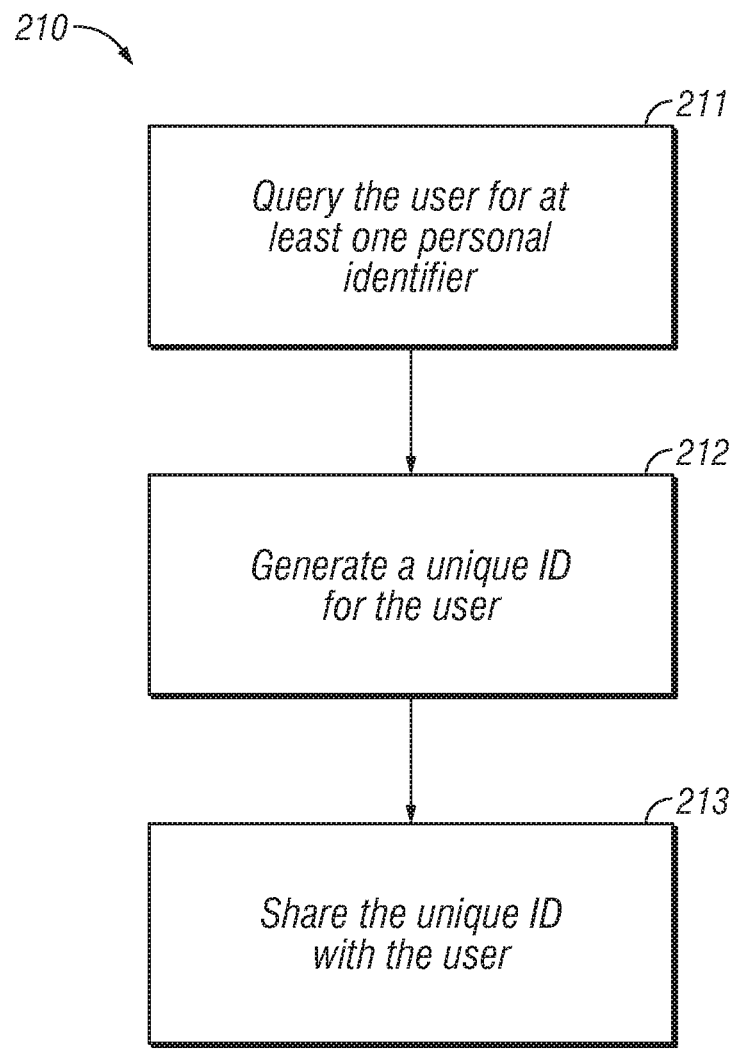
FIG. 17 is a flow diagram showing a process for assigning a unique ID to a user according to the invention.

FIG. 13 is a flow diagram showing creation of a personalization application according to the invention. As shown in FIG. 17, a method (1700) initially compiles granular data (1701). The granular data may typically constitute confidential information of the user. Granular data comprises interaction data from chats, Web logs, and voice. Granular data further comprises identity data, location logs, travel data, financial data, customer relationship management (CRM) data, demographic data, product usage, and social networking interactions.

User profile data is compiled (1702). The user profile data relates to behavioral data, identity data, and certain sets of granular data which are parameterized (1703).

User modeling is developed (1704) by using an algorithm, extracted feature sets, and responses based on the interactions.

The results based on user modeling are classified (1705) to obtain action scores, action sets, and so on.

Finally a personalization application or sets of personalization applications are created (1706) based on the results. The feature selection sets for user modeling may be obtained through data mining, machine learning techniques, and the like.

Another embodiment of the invention that takes personalization outside of the interaction mediums within the provider's, or entities associated with the provider's, control provides re-targeting via various advertising mechanisms, such as Google. For example, once the user is identified as a frequent traveller, the same information can be passed to providers, such as Google, via appropriate persons and/or segmentation definitions. All such users belonging to the segment can be configured to be shown relevant ads within Google.

Another embodiment of the invention can send email campaigns or offline campaigns via newsletters, etc. to target users in connection with travel related products.

In an embodiment, feature sets for user modeling may be obtained through methods such as probabilistic latent semantic analysis (PLSA) and term frequency inverse document frequency (Tf-idf) (see, for example, FIG. 5). The feature selection sets help create a user model which may, for example, predict the type of traveler, travel score, and other related features. The creation of a user profile framework enhances the user experience via a multitude of applications. By creating personalization techniques that adhere to different industry recommendations, alerts, notifications, and other features may be provided to the user.

Figure 14:
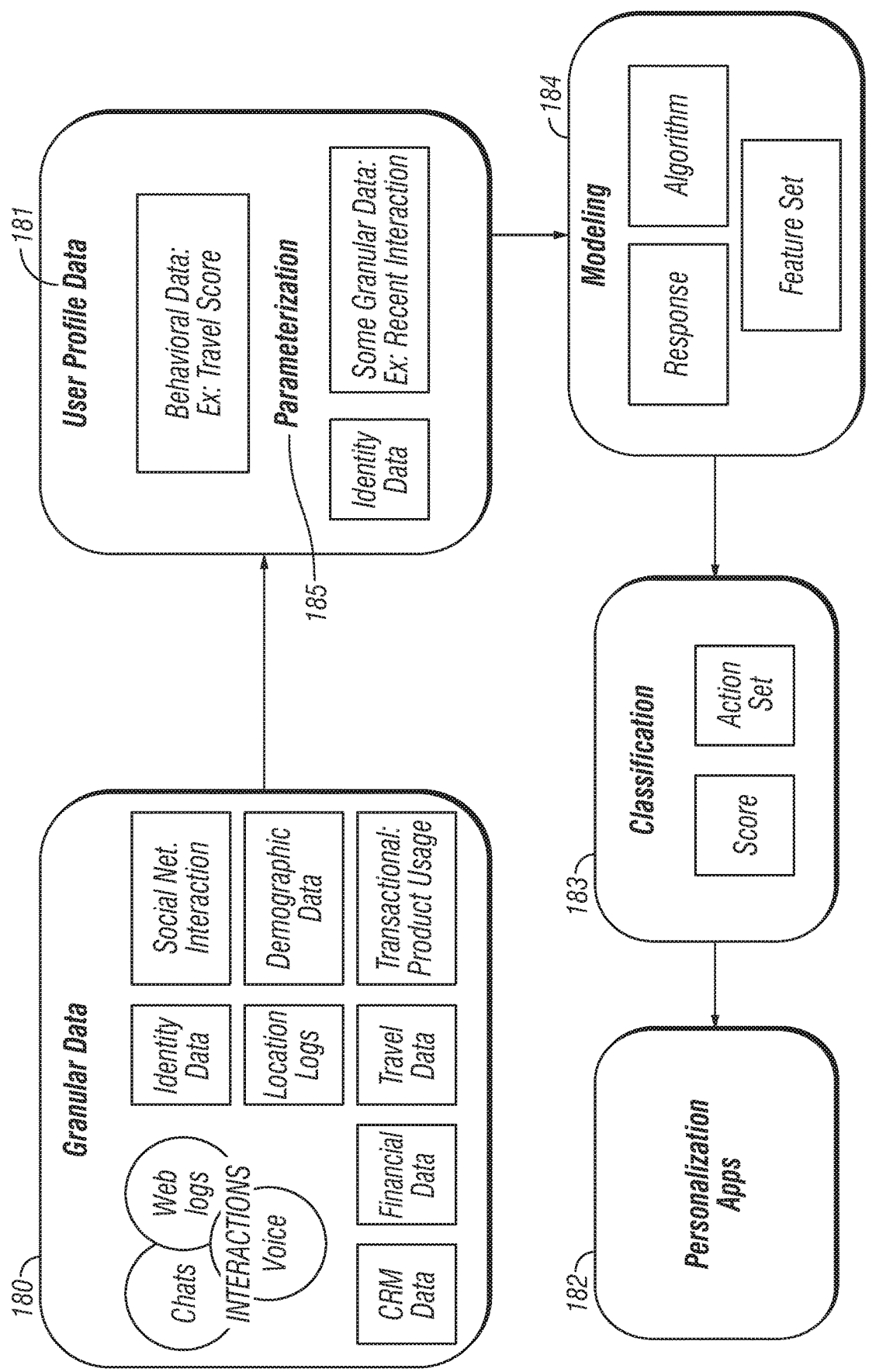
FIG. 14 is a block schematic diagram showing creation of a personalization application according to the invention.

The various actions shown in FIG. 13 may be performed in the order presented, in a different order, or simultaneously. Further, in some embodiments of the invention, some actions listed in FIG. 13 may be omitted. FIG. 14 is a block schematic diagram showing creation of a personalization application according to the invention. In FIG. 14, granular data 180, including interactions, such as chats, web logs, and voice information, other data, such as CRM data, financial data, identity data, location logs, travel data, social network interactions, demographic data, and transactions and product usage data are used in connection with user profile data 181, such as behavioral data. Parameterization 185 of this information produces, for example, identity data and passes on some of the granular data. All such information is used in modeling 184 which applies one or more algorithms to produce a feature set and response information. The model are classified 183 to produce an action set and score, which then results in one or more personalization apps 182.

Generating, Identifying, and Capturing User Data Across Interactions Using Unique User Identification The discussion above describes how a user profile can be built and used based upon user-related data collected across different sources. Methodology for linking a user across interactions is also discussed above. However, additional methodologies are needed to build a user profile across interactions from different organizations. The following discussion addresses this aspect of the invention.

Figure 15:
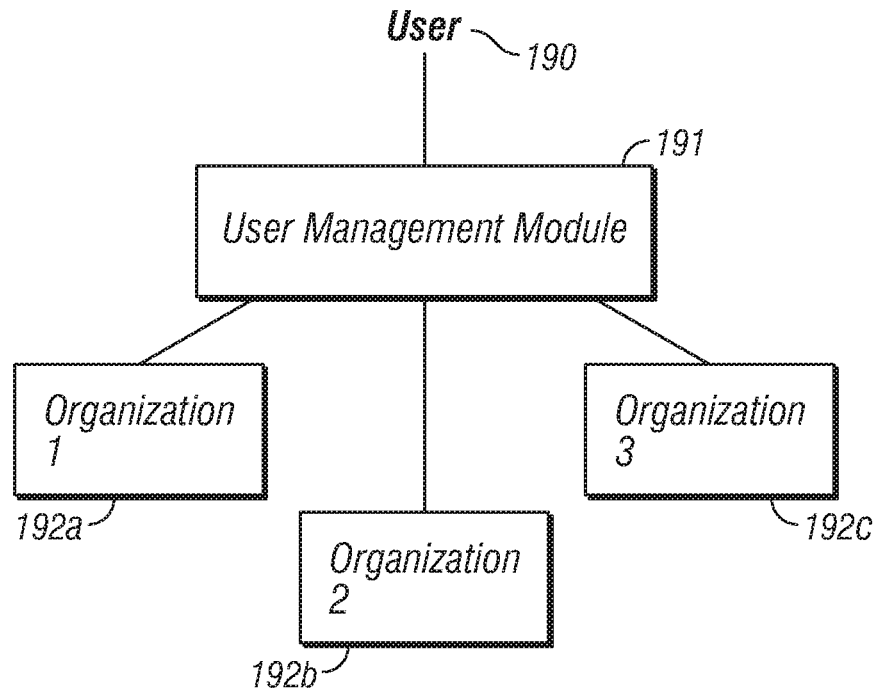
FIG. 15 is a block schematic diagram showing a network that enables a user to interact with another organization through a user management module according to the invention.

FIG. 15 is a block schematic diagram showing a network that enables a user to interact with another organization through a user management module according to the invention. As shown in FIG. 15, a user 190 interacts with at least one other organization 192*a*-192*c* through a user management module 191. The user may interact using at least one of a Web-based facility, such as a Web page, chat, social network, forum, and so on; a voice communication facility, such as a telephone line, cellular communication device, voice over Internet protocol (VoIP), and so on; and any other mode of interaction, such as a chat over a cellular communication network, interaction using an app residing on a user device, and so on. The organization may be any organization which interacts with users. The users may be another organization, a group of individuals, or a single individual. The user management module 191 is connected to the organizations 192*a*-192*c* using at least one of a Web-based facility, a voice communication, or any other mode.

In embodiments of the invention, when the user interacts with the user management module the user management module queries the user for at least one personal identifier. In another embodiment of the invention, the user management module automatically identifies at least one user identifier. The personal identifier may be at least one of the following, i.e. the user's name, user's phone number, user's email ID, and so on.

When the personal identifier is received from the user, the user management module generates a unique ID for the user. The unique ID may be at least one of a unique alphanumeric user name; a unique phone number, where the phone number is specifically assigned for use by this user across any organization and channels of communication; a unique Web link, where the Web link is specifically assigned for use by the user and the landing page of the Web link is customized for the user; and so on. The unique ID may be common for the user across all possible channels of interaction and also common across multitude of organizations with which the user interacts.

In another embodiment of the invention, the user management module may query the user regarding the type of unique ID the user desires to possess. The user management module then generates the unique ID based on the response of the user to the query.

In another embodiment of the invention, the user management module may start tracking and storing the user's journey at the time of generating and assigning a unique user ID to the user by a mechanism that includes a cookie.

Those skilled in the art will appreciate that the above functionality may be performed by another module external to the user management module and may be communicated to the user management module using suitable means.

When the user for whom a unique ID has been generated and assigned contacts the user management module, the user management module identifies the user based on the unique ID. Because the unique ID could be a unique phone number or a unique Web link, when the user contacts the user module by such modes, i.e. where the user navigates to a specific Web page or calls on his telephone, the user management module automatically identifies the user based on the mode of communications employed by the user. Alternatively, where automatic unique ID identification is not possible, the user management module may query the user to provide a unique user ID.

Once the user has been identified, the user management module queries the user regarding the service for which the user is looking, begins to track the user's interaction journey, and stores the relevant information from the journey, including time of interaction, mode of interaction, content or nature of query, user location, and the like in a data base. This information can be used for building, updating, or modifying a user profile linked to the unique ID.

The above listed embodiments are merely examples of how the user may be identified to the user management module. The person of ordinary skill in the art will appreciate that it is possible, within the scope of the invention, to use any other technique that allows the user to be identified to the user management module.

The user management module may query the user using any suitable mechanism such as, for example, an interactive voice response (IVR) system; chat session, which may be manual or automated; human agent; popup widget in a Web page; and so on.

The user may be seeking service, for example, by contacting an organization to solve an issue, to obtain answers to a query, and so on. When a response is obtained from the user, the user management module attempts to enable the user to access the service. Thus, the user management module may direct the user to the service upon checking that the appropriate contact details for the service are present within the user management module.

In another embodiment of the invention the user management module may contact directory assistance, obtain the phone number of the service, and place a telephone call to the phone number of the respective service. Once the telephone call is connected, the user management module connects the user to the telephone call.

In another embodiment of the invention, when the user connects with the user management module using the World Wide Web, after identifying the unique ID of the user and querying the user as to the service for which the user is looking, the user management module routes the user to the Web page of the service, which may be any one of a FAQ page, a help page, a chat page, a social networking page, a forum, and so on by using, for example, at least one of a popup window, a new window and/or tab in the browser this is used by the user, and a widget.

In other embodiment of the invention, the user management module may be in operative communication with a customer care center of the service that the user intend to contact. In this example, the user management module records the user journey of an interaction between the user and the customer care center of the service in a database. This information may also be used for building, updating, or modifying user profile linked to the unique ID.

In an embodiment of the invention, the user management module tracks a further journey of the user by such mechanisms as a cookie. The cookie may then be used to identify the user if the user returns to the same channel for another query.

Figure 16:
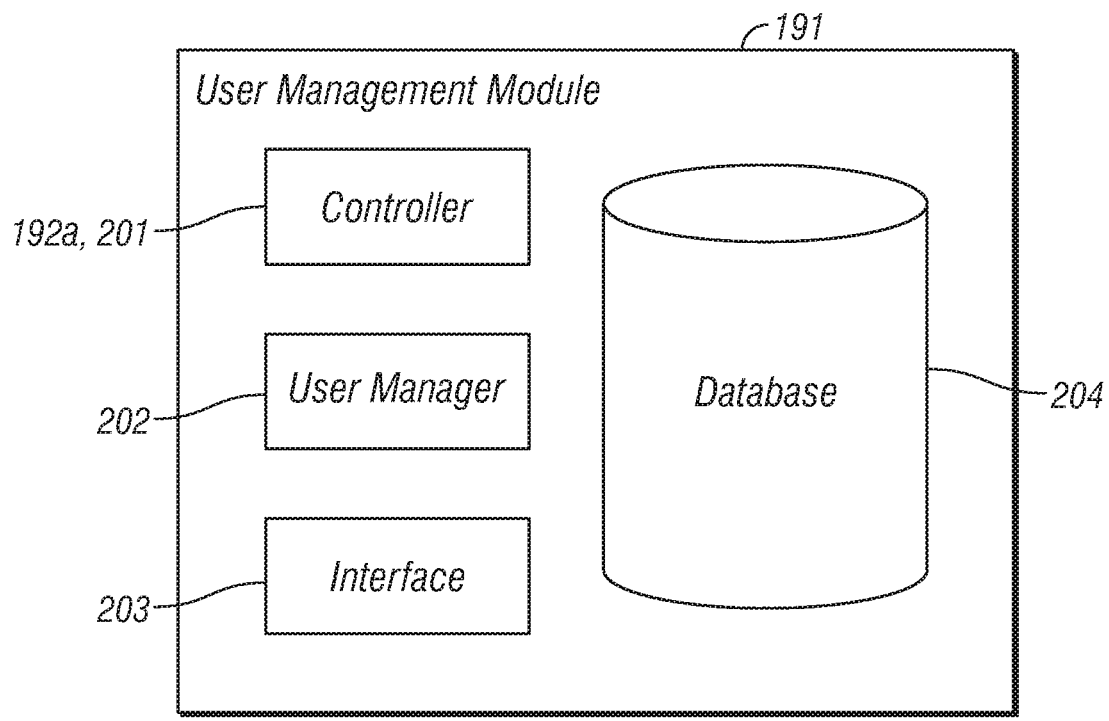
FIG. 16 is a block schematic diagram showing a user management module according to the invention.

FIG. 16 is a block schematic diagram showing a user management module according to the invention. The user management module comprises a controller 201, a user manager 202, an interface 203, and a database 204. The interface enables the user management module to communicate with the user, organizations, directory assistance, and any other external entities. The database stores data related to the user, such as at least one unique ID of the user, details of interactions, queries or services accessed by the user during such interactions, feedback, and so on. The database also stores data related to organizations, such as contact details of the organizations, e.g. phone numbers, Web sites, and so on. The database may also be updated with contact details of organizations which were not previously present in the database.

When the user interacts with the controller 201, the user manager 202 queries the user for at least one personal identifier or automatically ascertains at least one such personal identifier. On receiving or ascertaining the personal identifier from the user, the user manager generates a unique ID for the user. The unique ID may be any of a unique alphanumeric user name; a unique phone number, the phone number is specifically assigned for use by this user; a unique Web link, where the Web link is specifically assigned for use by this user, and where the landing page of the Web link may be customized for the user; and so on.

In another embodiment of the invention, at the time of generating and assigning unique user ID to the user the user controller may start tracking and storing the journey of the user via a suitable mechanism that includes a cookie.

When the user for whom a unique ID has been generated and assigned contacts the controller via the interface the controller, along with the user manager, identifies the user via the unique ID. Once the user has been identified, the user controller queries the user regarding the service for which the user is looking, begins to track user interaction journey, and stores the relevant information from the journey, including time of interaction, mode of interaction, content or nature of query, user location, and the like, in the database. This information can be used for building, updating, or modifying the user profile that is linked to the unique ID.

The controller may query the user via the interface using any suitable mechanism, such as an interactive voice response (IVR) system; chat session, which may be manual or automated; human agent; popup widget in a Web page; and so on.

When the response is obtained from the user, the controller attempts to connect the user to the service. In an embodiment of the invention, the controller directs the user to the service via the interface in a manner that is transparent to the user and the service provides the user with requested services.

Alternatively, the controller may direct the user directly to the requested services if the appropriate contact details of the service are present within the database.

In another embodiment of the invention, the controller may be in operative communication with a customer care center of the service the user intents to contact. In such case, the controller records the user's journey for interactions between the user and the customer care center of the service and stores the this information in the database. The information can be used for building, updating, or modifying user profile linked to the unique ID.

In another embodiment of the invention, the controller tracks the further journey of the user using a suitable mechanism, such as a cookie.

FIG. 17 is a flow diagram showing a process (210) for assigning a unique ID to a user according to the invention. When the user interacts with the user management module, the user management module queries (211) the user for at least one personal identifier or automatically ascertains at least one such personal identifier. The personal identifier may be at least one of the user's name, user's phone number, user's email ID, and so on.

Upon receiving or ascertaining the personal identifier from the user, the user management module generates (212) and shares a unique ID for the user. The unique ID may be any of a unique alphanumeric user name; unique phone number, where the phone number is specifically assigned for use by the user; a unique Web link, where the Web link is specifically assigned for use by the user, and the landing page of the Web link may be customized for the user; and so on.

The various actions shown in FIG. 21 may be performed in the order presented, in a different order, or simultaneously. Further, in some embodiments of the invention some of the actions shown in FIG. 17 may be omitted.

Computer Implementation

The embodiments disclosed herein can be implemented through at least one software program running on at least one hardware device and performing network management functions to control the network elements. The network elements shown in the figures include blocks which can be at least one of a hardware device, or a combination of hardware device and software module.

Figure 18:
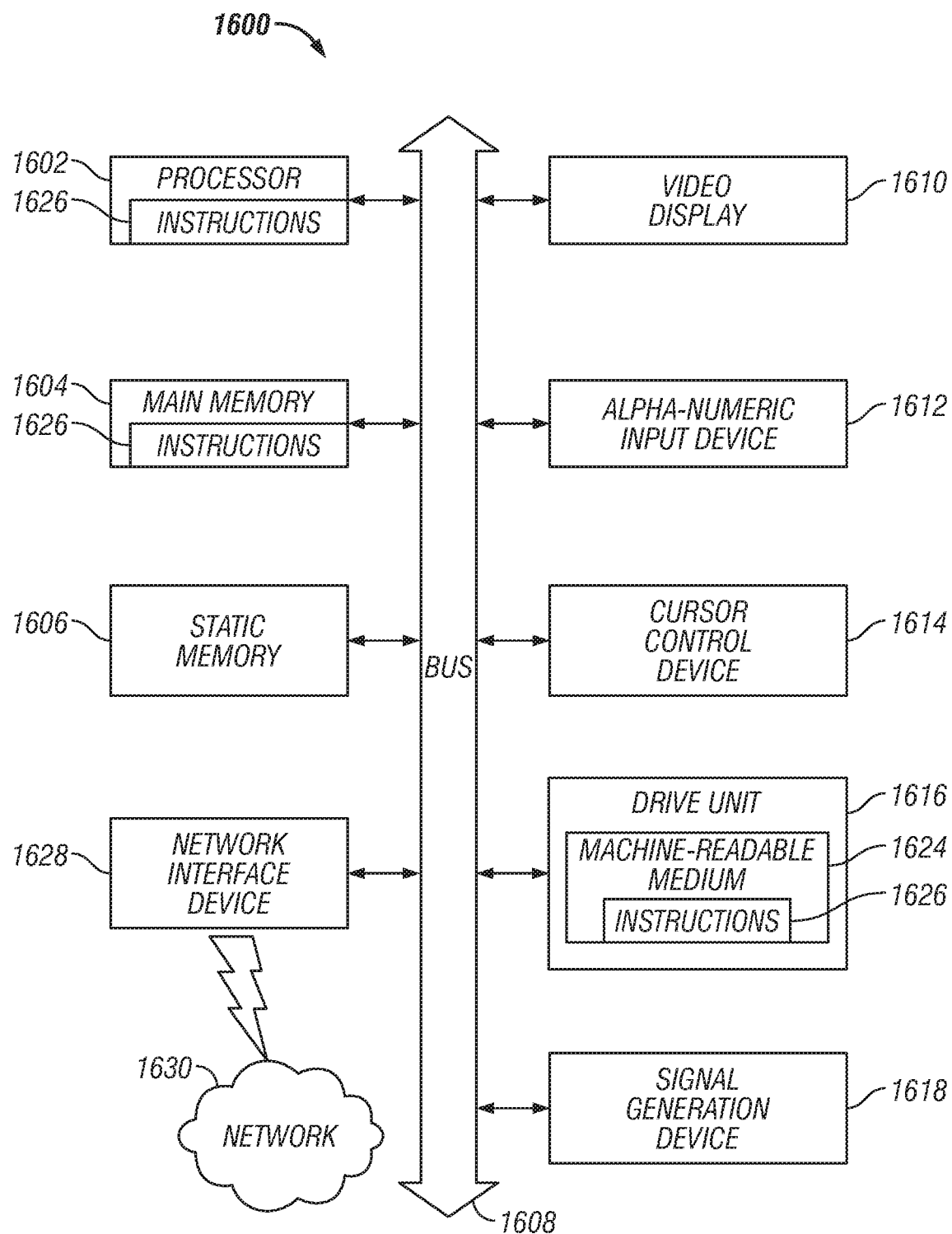
FIG. 18 is a block schematic diagram showing a machine in the exemplary form of a computer system within which a set of instructions for causing the machine to perform any of the herein disclosed methodologies may be executed.

FIG. 18 is a block schematic diagram that depicts a machine in the exemplary form of a computer system 1600 within which a set of instructions for causing the machine to perform any of the herein disclosed methodologies may be executed.

In alternative embodiments, the machine may comprise or include a network router, a network switch, a network bridge, personal digital assistant, a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Other alternatives include a digital signal processing chip (DSP), discrete circuitry (such as resistors, capacitors, diodes, inductors, and transistors), field programmable gate array (FPGA), programmable logic array (PLA), programmable logic device (PLO), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method of using a unique ID for capturing user data from across a plurality of channels, the method comprising;
   providing a processor for implementing a user management module, said user management module creating a plurality of linkages across a plurality of channels, devices, and sessions through which a user interacts with a plurality of organizations, wherein each linkage is made probabilistically based on a user's journeys on said plurality of channels;
   said user management module either querying said user for at least one personal identifier or automatically identifying at least one of a plurality of user identifiers when said user interacts with said user management module, wherein said plurality of user identifiers is created, captured, or passed among said plurality of channels and across said plurality of organizations with which said user interacts;
   said user management module generating a unique ID for said user when said user management module receives said personal identifier from said user or automatically identifies said at least one of a plurality of user identifiers, wherein said unique ID is common for said user across all channels of interaction and across said plurality of organizations with which said user interacts; and
   said user management module processing information indicative of said user's interactions on said plurality of channels to continuously create a user profile used to personalize services for said user linked to said user profile via said unique ID.

2. The method of claim 1, wherein each linkage is made probabilistically based on machine learning and statistical models driven by behavior and attributes of said user's journeys on said plurality of channels.

3. The method of claim 1, wherein said personal identifier is any of a username, a telephone number, and an email ID.

4. The method of claim 1, wherein said unique ID is any of a unique alphanumeric user name, a unique telephone number specifically assigned for use by said user across any organization and channel of interaction, or a unique web link specifically assigned for use by said user, wherein a landing page of said unique web link is customized for said user.

5. The method of claim 1 further comprising:
   said user management module querying said user for a type of unique ID that said user desires to possess; and
   said user management module generating said unique ID based on a response of said user to said query.

6. The method of claim 1 further comprising:
   said user management module tracking and storing a journey of said user at a time of generating and assigning said unique ID to said user.

7. The method of claim 1 further comprising:
   said user management module identifying said user based on said unique ID when said user for whom a unique ID has been generated and assigned contacts said user management module.

8. The method of claim 7 further comprising:
   said user management module querying said user regarding a service that said user is requesting once said unique ID of said user has been identified;
   said user management module tracking an interaction journey and storing relevant information of said interaction journey in a database; and
   said user management module using said relevant information for any of building, updating, and modifying said user profile that is linked to said unique ID.

9. The method of claim 8, wherein said relevant information comprises any of a time of interaction, mode of interaction, content or nature of query, and user location of said interaction journey.

10. The method of claim 1, wherein said user management module queries said user by any of an interactive voice response (IVR) system, a manual or automated chat session, or a popup widget in a webpage.

11. The method of claim 1 further comprising:
    said user management module attempting to enable said user to engage with a requested service when a response is received by said user management module from said user.

12. The method of claim 1 further comprising:
    said user management module checking for appropriate contact details of an organization and directing said user to said organization if said contact details are present.

13. The method of claim 1 further comprising:
    said user management module contacting directory assistance, obtaining a telephone number of an organization, and placing a telephone call to said telephone number of said organization; and
    said user management module connecting said user to said telephone call when said telephone call to said organization connected.

14. The method of claim 1 further comprising:
    after identifying said unique ID of said user and querying said user for a requested service, said user management module routing said user to a webpage of an organization.

15. The method of claim 1 further comprising:
    said user management module operatively communicating with a customer service center of an organization from which said user intend to request services.

16. The method of claim 15 further comprising:
    said user management module recording interactions between said user and said customer service center during a user journey in a database; and
    said user management module using information stored in said database for any of building, updating, and modifying said user profile linked to said unique ID.

17. A computer device comprising:
    a processor; and
    a memory including instructions that, when executed by said processor, causes said computer device to:
    create a plurality of linkages across a plurality of channels, devices, and sessions through which a user interacts with a plurality of organizations, wherein each linkage is made probabilistically based on a user's journeys on said plurality of channels;

querying said user for at least one personal identifier or automatically identifying at least one of a plurality of user identifiers that are each created, captured, or passed among said plurality of channels and across said plurality of organizations with which said user interacts;

generating a unique ID for said user upon receipt of said personal identifier from said user or automatically identifying said at least one of a plurality of user identifiers, wherein said unique ID is common for said user across all channels of interaction and across said plurality of organizations with which said user interacts; and processing information indicative of said user's interactions on said plurality of channels to continuously create a user profile used to personalize services for said user linked to said user profile via said unique ID.

18. The computer device of claim 17, wherein said user interacts on said plurality of channels through at least one of a webpage, chat application, social network, or electronic forum.

19. The computer device of claim 17, wherein said user interacts with said user management module via at least one of a telephone line, cellular communication, or voice over internet protocol (VOIP).

20. A computer implemented method comprising:

creating a plurality of linkages across a plurality of channels, devices, and sessions through which a user interacts with a plurality of organizations;

identifying at least one of a plurality of user identifiers that are each created, captured, or passed among said plurality of channels;

generating a unique ID for said user based on said at least one of said plurality of user identifiers, wherein said unique ID is common for said user across all channels of interaction through which said user interacts with said plurality of organizations; and processing information indicative of said user's interactions on said plurality of channels to continuously create a user profile used to personalize services for said user linked to said user profile via said unique ID.

* * * * *